(12) United States Patent
Maddahi et al.

(10) Patent No.: US 12,354,492 B2
(45) Date of Patent: Jul. 8, 2025

(54) VIBROTACTILE METHOD, APPARATUS AND SYSTEM FOR TRAINING AND PRACTICING DENTAL PROCEDURES

(71) Applicant: TACTILE ROBOTICS LTD., Winnipeg (CA)

(72) Inventors: Ali Maddahi, Winnipeg (CA); Shahriar Bagheri, Winnipeg (CA); Maziar Mardan, Winnipeg (CA); Maryam Kalvandi, Winnipeg (CA); Yaser Maddahi, Winnipeg (CA)

(73) Assignee: Tactile Robotics Ltd., Winnipeg (CA)

( * ) Notice: Subject to any disclaimer, the term of this patent is extended or adjusted under 35 U.S.C. 154(b) by 1108 days.

(21) Appl. No.: 17/271,470

(22) PCT Filed: Aug. 28, 2019

(86) PCT No.: PCT/CA2019/051190
§ 371 (c)(1),
(2) Date: Feb. 25, 2021

(87) PCT Pub. No.: WO2020/041879
PCT Pub. Date: Mar. 5, 2020

(65) Prior Publication Data
US 2021/0312834 A1 Oct. 7, 2021

Related U.S. Application Data

(60) Provisional application No. 62/725,253, filed on Aug. 30, 2018.

(51) Int. Cl.
*G09B 23/28* (2006.01)
*G05G 5/03* (2008.04)
(52) U.S. Cl.
CPC ............. *G09B 23/283* (2013.01); *G05G 5/03* (2013.01)

(58) Field of Classification Search
USPC ......................................................... 434/263
See application file for complete search history.

(56) References Cited

U.S. PATENT DOCUMENTS

2008/0102418 A1* 5/2008 Krieger ................ A61C 1/0015
433/132
2010/0167248 A1* 7/2010 Ryan ..................... H04N 7/181
434/262
(Continued)

FOREIGN PATENT DOCUMENTS

WO 2018067562 4/2018

OTHER PUBLICATIONS

"Evaluation of a Vibrotactile Simulator for Dental Caries Detection," Kuchenbecker et al., Simulation in Healthcare, 12:148-156, 2017 (Year: 2017).*
(Continued)

*Primary Examiner* — James B Hull
(74) *Attorney, Agent, or Firm* — Ryan W. Dupuis; Michael R. Williams; Ade & Company Inc.

(57) ABSTRACT

A dental procedure training system has one or more apprentice workstations that use data acquired from an instructor workstation. The instructor workstation has a dental tool and a sensory system to sense an operating characteristic(s) of the dental tool while the dental tool performs a dental procedure. The apprentice workstation has a training tool with a handle grip representative of the handle grip of the dental tool. The training tool may have a vibrotactile actuation system embedded in the training tool to generate vibrotactile feedback through the handle grip of the training tool and a processing unit to operate the vibrotactile actuation system according to the operating characteristic(s) sensed by the sensory system of the instructor workstation. Alternatively, the training tool may be operational to perform said dental procedure, in which the processing unit
(Continued)

compares operating characteristics sensed by the apprentice workstation and by the instructor workstation.

18 Claims, 7 Drawing Sheets

(56) References Cited

U.S. PATENT DOCUMENTS

2016/0259061 A1\* 9/2016 Carter .................... G01S 19/28
2017/0281280 A1\* 10/2017 Haider ................. A61B 1/3132

OTHER PUBLICATIONS

Kuchenbecker, et al., "Evaluation of a Vibrotactile Simulator for Dental Caries Detection", Simulation in Healthcare, vol. 12, Issue 3, pp. 148-156, Jun. 2017; https://journals.lww.com/simulationinhealthcare/Fulltext/201706000/Evaluation_of_a_Vibrotactile_Simulator_for_Dental.3.aspx. Entire document.

\* cited by examiner

VIBROTACTILE METHOD, APPARATUS AND SYSTEM FOR TRAINING AND PRACTICING DENTAL PROCEDURES

FIELD OF THE INVENTION

The present invention relates to training tools used by an apprentice to practice dental procedures, and more particularly the present invention relates to a training system and method of use of the training system such that (i) an apprentice using a training tool at an apprentice workstation receives vibrotactile feedback representative of the vibrotactile feedback felt by an instructor using a dental tool at an instructor workstation to perform a dental procedure, and/or (ii) an apprentice using a training tool at an apprentice workstation receives quantitative feedback based on a calculated comparison of at least one operational characteristic of the training tool relative to a corresponding operational characteristic of the dental tool used by the instructor at the instructor workstation, whereby apprentices using the invention are able to understand the technic and vibrotactile characteristics of the dental procedures conducted by their instructor in a classroom, dental laboratory, or dental clinic.

BACKGROUND

Education is the foundation of society and leads to economic wealth and social prosperity. Nowadays, students, apprentices, and novice practitioners must be equipped with a well-balanced knowledge and necessary skills to not only participate effectively as responsible members of the society but to also contribute towards its development of shared values and common identity. Amongst the students of different fields of science, the health sciences students have relatively greater responsibilities towards society's welfare as they directly deal with human beings. Therefore, challenges and corresponding issues in educating students must be identified and investigated for improvement.

Traditional Approaches

In the health sciences, the use of classroom and hands-on training by experts have been a training mechanism of choice for most training programs. This training mechanism is also called the traditional novice-expert apprenticeship model as described in K. Kunkler, "*The role of medical simulation: an overview*", Int. J. of Medical Robotics and Computer Assisted Surgery, vol. 2, pp. 203-210, 2006. In this traditional model, health sciences students such as dental students (hereafter called apprentices) acquire technical dental skills through years of hands-on training in dental laboratories and clinics and receive supervision and feedback from their mentors relative to dental performance skills. Specifically, mentors conduct a procedure that offers the apprentices the opportunity of observing, then assisting, and finally performing that procedure under the supervision of their mentor. That is how apprentices acquire years of hands-on training and deliberate practice in mastering the required skills. In other words, apprentices have learned the nuances of required skills through working on artificial materials, cadaveric organs, animals, and case observations, and have received largely qualitative feedback on their performance from their mentor as supported in T. Sugiyama, S. Lama, L. S. Gan, Y. Maddahi, K. Zareinia, and G R. Sutherland, "*Forces of tool-tissue interaction to assess surgical skill level*", JAMA Surgery, vol. 153, no. 3, pp. 234-242, 2017, and Gan L S, Zareinia K, Lama S, Maddahi Y, Yang F W, Sutherland G R. *Quantification of forces during a neurosurgical procedure: A pilot study*, World neurosurgery, 2015 Aug. 1; vol. 84, no. 2, pp. 537-48. In the field of dentistry, the traditional novice-expert apprenticeship model is time-consuming, as the training process is slow and may also affect the patient's comfort. Moreover, apprentices always need their mentor to be present in order to practice and learn the key skills of operations. Additionally, due to the lack of quantitative measures to assess aspects of technical skills, the knowledge acquired and subsequently relayed through generations of dentists remains largely qualitative. As a result, trial and error often constitute a major part of learning psychomotor skills for an apprentice. With decreasing operating hours and training resources, there is an increasing demand to improve training efficiency and provide a quantitative evaluation of dental performance.

Skills Assessment & Instrumentation

In order to objectively assess technical dental skills, it is implicit that one must first be able to measure and study essential aspects of dental performance. One important aspect of instrument handling is the understanding and ability to use the instrument (such as dental handpiece) to effectively, yet safely, accomplish the dental goal. There are several tactile skills that should be understood and learned by the apprentices. Most importantly, the apprentice should know how to hold the dental handpiece (orientation and position of the handpiece), comprehend how fast the drill should rotate, perceive the level of the vibration produced by the handpiece during the performance of the dental task (acceleration and jerk) and receive adequate alerts once the task is followed by the apprentice in an incorrect way. The tactile skills listed above may vary depending on the type and the tooth, regions of the oral cavity, or conducted tasks. Understanding the tactile skills could be made possible through the incorporation of sensory and actuation systems onto a conventional tool such as a dental rotary handpiece in restorative dentistry.

Riener R., and Burgkart R. (February 2013), "Method and device for learning and training dental treatment techniques", U.S. Pat. No. 8,376,753 discloses a device for teaching and training dental treatment techniques has been developed in which a force is applied to a tooth, preferably by means of tools, in order to examine or treat this tooth. The mandible or a tooth is coupled to a force measuring device in a manner that enables the forces applied to the tooth to be represented in the form of electric measurement signals that are fed to a data processing device. Said data processing device has a data memory in which a multitude of reference-force/time-courses of different force/time-determined tooth treatment steps can be stored in a manner that enables them to be retrieved, whereby the forces applied to the tooth and their temporal-course are compared with a reference-force/time-course. In this invention, an experienced dentist examines the tooth by means of a tool or starts applying the force to the tooth, using a drill or plier. Then, the force applied to the tooth or mandible is measured by a measuring device, such as a force sensor. The measured data acts as a reference signal that will later be used for comparison purposes by the dental students. The force/time-courses created by an apprentice is also measured and compared with the reference data. The measurements and reference data are plotted as curves on a display, and a correlation coefficient is determined based on the deviation between the two curves. The correlation coefficient is used to find the degree of conformity between the stored data and actual data. Moreover, audible signal patterns are retrieved and audibly displayed by means of an acoustic display unit such as loudspeakers, which means that screams of pain are played if the calculation shows that the tip of the drill invades an area of the nerve of the tooth roots. Additionally, the position of the force-application point of the tool is localized by means of a navigation system, such as a camera and optical systems. In summary, the invention improves the training and learning process of dental treatment through visual and acoustic interactions, such that the fine motor skills that are imparted by the mentor to the apprentice.

Ranta J. F., Aviles W. A., Bruce Donoff R., and Nelson L. P. (August 2002), "Methods and apparatus for simulating dental procedures and for training dental students", United States Patent Application Publication no. 2002/0119432 A1, and Ranta, John F., Walter A. Aviles. R. Bruce Donoff, and Linda P. Nelson. "Methods and apparatus for simulating dental procedures and for training dental students." U.S. Pat. No. 7,249,952, issued Jul. 31, 2007 disclose a training system has been presented using haptically-enabled simulations of dental procedures to provide the sensorimotor involvement needed for dental training. To provide the tactile feedback combined with a realistic visual experience, the system integrates an off-the-shelf haptic stylus interface for simulating the movement and feel of the tooltip with a 3D stereoscopic display. The haptic stylus enables the dental student to orient and to operate simulated dental tools. Working on a virtual model viewed in a stereo display, dental students can use a simulated pick to probe a tooth or a simulated drill to prepare a tooth for cavity repair. The touch feedback is simulated by representing these dental instruments as force-to-a-point tools, which map to haptic simulation procedures executed on a computer workstation that also provides the visual display.

Hayka A., Eyton L., and Denx Ltd. (November 1997). "Image sound and feeling simulation system for dentistry", U.S. Pat. No. 5,688,118 discloses a visual-audio-feeling simulation system was invented for dentistry that comprises a dental handpiece with a drill (possessing a drilling end) for drilling a cavity in a tooth. Firstly, a 3D sensor, attached to the dental handpiece, provides the system with the position and orientation of the drill; a data processing unit and a display unit for simulating the drill end are employed. The system further controls the flow of compressed air operating the drill, and thus controls the drill's speed. This imitates the sound and hand-feeling associated when drilling through tooth layers of different hardness. In summary, the simulation system can (i) simulate the real process of drilling a tooth during dental treatment or (ii) imitate the real process of drilling an artificial tooth during training, and (iii) visualize the entire process on an enlarged display. Therefore, the apprentice can also monitor in real-time an actual dental treatment performed by a dentist.

Azerad, J., Blanchard, J., Maurin, Y., Universite Paris Diderot, 2004. System and method for virtual reality training for odontology. U.S. Patent Application 2004/0091845 A1 discloses a training platform was developed using haptically-enhanced simulations of dental procedures. The system provides the sensorimotor involvement required for dental training. To provide the touch feedback combined with a realistic visual experience, the system integrates a haptic stylus interface for simulating the movement and feeling the tool-tip with a 3D display. The haptic stylus enables the dental student to orient and to operate simulated dental tools. Working on a virtual model viewed in a display, dental students can use a simulated pick to probe a tooth, or a simulated drill to prepare a tooth for cavity repair. The touch feedback is simulated by representing these dental instruments as the force to-a-point tools which map to haptic simulation procedures executed on a computer workstation that also provides the visual display.

Kuchenbecker, K. J., Parajon, R. C. and Maggio, M. P., 2017. *Evaluation of a vibrotactile simulator for dental caries detection. Simulation in Healthcare*, vol. 12, no. 3, pp. 148-156 discloses a simulator was developed to educate dental students in caries detection, and allows dental faculty to share, record, and replay the tactile vibrations felt through a dental hand instrument. This simulation approach assessed by asking experienced dental educators to evaluate the system's real-time and video playback modes. The simulator uses an accelerometer to sense instrument vibrations and a voice coil actuator to reproduce these vibrations on another tool.

Virtual Reality & Augmented Reality

In addition to physical devices for training in dentistry, there exist some studies on the performance of available dental simulators that use the mechanical properties of teeth to simulate the oral cavity on which dental tasks are conducted. Research has assessed the perception of academic staff members on the realism of the Simodont® haptic 3D-VR (virtual reality) dental trainer as disclosed in Bakr M. M., Massey W. L., and Alexander H., "*Evaluation of SIMODONT® haptic 3D virtual reality dental training simulator*", *Int. J. of Dental Clinics*, vol. 5. no. 4, 6 pages, 2013. This simulator was manufactured by MOOG Industrial Group, Amsterdam. This simulator comprises a simulator unit, a panel, a stereo projection, a spacemouse, a handpiece, and a projector. The Simodont® courseware has been developed by the Academic Centre for Dentistry in Amsterdam. The courseware allows a variety of operative dental procedures to be practiced in a virtual oral and dental environment with force feedback.

A haptic-based dental simulator was also developed and preliminary user evaluations on its first-generation prototype have been carried out as disclosed in Wang D., Zhang Y., Hou J., Wang Y. Lv P., Chen Y., and Zhao H., "*iDental: a haptic-based dental simulator and its preliminary user evaluation*", *IEEE Trans. On Haptics*, vol. 5, no. 4, pp. 332-343, October-December 2013. Based on the detailed requirement analysis of periodontics procedures, a combined evaluation method including qualitative and quantitative analysis was designed.

Most of the dental simulators use the concept of VR. In the 1990s, the concept of a VR dental training system was introduced to practice cavity preparation as disclosed in Ranta J. F. and Aviles W. A., "*The virtual reality dental training system-simulating dental procedures for the purpose of training dental students using haptics,*" *Proc. Fourth PHANTOM Users Group Workshop*, November 1999. A training system was developed, enabling the operator to practice the detection of carious lesions as described in Thomas G A., Johnson L., Dow S., and Stanford C., "*The design and testing of a force feedback dental simulator.*" *Computer Methods and Programs in Biomedicine*, vol. 64, pp. 53-64, 2000. PerioSim© was developed for periodontal simulation, which can simulate three typical operations including pocket probing, calculus detection, and calculus removal as described in Luciano C., Banerjee P., and DeFanti T., "*Haptics-based virtual reality periodontal training simulator,*" *Virtual Reality*, vol. 13, no. 2, pp. 69-85, 2009. Two generations of prototypes were developed by hapTEL based on feedback from user evaluation as described in Tse B., Harwin W., Barrow A., Quinn B., San Diego J., and Cox M., "Design and development of a haptic dental training system—hapTEL," EuroHaptics '10: Proc. Int'l Conf. Haptics Generating and Perceiving Tangible Sensations, 2010. Forsslund Dental system was developed to practice dental drilling and wisdom tooth extraction as described in Forsslund J., Sallnas E. L., and Palmerius K. J., "A user-centered designed foss implementation of bone surgery simulations," Proc. World Haptics Conf., pp. 391-392, 2009. A haptics-based VR periodontal training simulator was developed to demonstrate the scientific contribution and usefulness of the simulator as a vital part of the periodontics curriculum as described in Steinberg A. D., Bashhok P. G., Drummond J., Ashrafi S., and Zefran M., "Assessment of faculty perception of content validity of PerioSimC, a haptic-3D virtual reality dental training simulator", J. of Dental Education, vol. 71, no. 12, pp. 1574-1582, 2007. A haptic VR crown preparation simulator was presented in Rhienmora P., Haddawy P., Suebnukarn S., and Dailey M. N., "Intelligent dental training simulator with objective skill assessment and feedback," Artificial Intelligence in Medicine, vol. 52, pp. 115-121, 2011 which includes a VR environment with haptic feedback for dental students to practice dental surgical skills, in the context of a crown preparation procedure. The simulator addressed challenges in traditional training such as the subjective nature of surgical skill assessment and the limited availability of expert supervision. A PHANTOM Omni haptic device was used that allowed for six degrees of freedom (DOFs) for position sensing and generated three DOF for force feedback. The virtual dental handpiece was locked to the position and orientation of the haptic stylus as described in SensAbleTechnologies, OpenHaptics toolkit, http://www.sensable.com/products-openhaptics-toolkit.htm; 2005, accessed in 2018. Simulator software was also developed using Open-Haptics SDK 2.0 (Haptic Device API) and optimized collision detection as referenced in Terdiman P. Memory-optimized bounding-volume hierarchies, http://www.codercorner.com/Opcode.pdf; 2001, accessed in 2018.

A VR dental training system was presented to address limitations in previous systems and to introduce new techniques in which (i) tooth data are presented as a 3D multi-resolution surface model, reconstructed from a patient's volumetric data to improve real-time rendering performance (when compared to a direct volume rendering technique); (ii) collision detection and collision response algorithms were applied that could handle a non-spherical tool such as a cylindrical one; (iii) The system simulated tooth surface exploration and cutting with a cylindrical burr by utilizing a surface displacement technique as referenced in Rhienmora, P., Haddawy, P., Dailey, M. N., Khanal, P. and Suebnukarn, S., "Development of a dental skills training simulator using virtual reality and haptic device", NECTEC Technical Journal, vol. 8, no. 20, pp. 140-147, 2008. A system using a commercial haptic device was used to replicate a realistic experience for dental and dental hygiene students and clinicians as well as to train periodontal procedures according to Eid, M., Loomer, P., Sefo, D., Korres, G. and Karafotias, G., New York University, 2016. Haptic-based dental simulation. U.S. Patent Application 2017/0352292 A1. The system has three features: (i) a custom grip to attach dental instruments to the haptic device, which enhances the grip experience since learners feel the tactile properties of the instruments; (ii) two haptic devices are utilized to simulate haptic feedback with both the dental instrument (dominant hand) and the mirror instrument (non-dominant hand); and (iii) a finger support mechanism using parallel manipulation is used for the intraoral fulcrum during probing. The system includes software and hardware subsystems. The software subsystem comprises two graphical user interface (GUI) in which an instructor defines periodontal exercises for learners to practice with and a simulation window where periodontal exercises are displayed for learners to interact with.

Augmented reality (AR) haptic systems have also been used for dental surgical skills training. A dental training simulator utilizing a haptic device was developed based on AR and VR technologies as described in Rhienmora P., Gajananan K., Haddawy P., Dailey M. N., and Suebnukarn S., "Augmented reality haptics system for dental surgical skills training, ACM Symposium on Virtual Reality Software and Technology, pp. 97-98. November 22-24, 2010, Hong Kong. The simulator utilizes volumetric force feedback computation and real-time modification of the volumetric data to allow students practicing dentistry in proper postures by combining the three-dimensional models of the tooth and tool with the real-world view (by means of the monocular camera) and displaying the result through a video see-through head-mounted display. This dental simulator consists of a graphical display and a haptic device for simulation of virtual dental tools. The system allows dentists to practice using a probe to examine the surface of a tooth, to feel its hardness, and to drill or cut the tooth.

The Iowa dental surgical simulator unit focuses on tactile skill development as described in Johnson L., Thomas G., Dow S., and Stanford C., "An initial evaluation of the iowa dental surgical simulator", J. of Dental Education, vol. 64, no. 12, pp. 847-853, 2000. The system consists of three hardware components: a computer, a monitor, and a force feedback device with software. Participants interact with the computer by grasping a joystick or explorer handle attached to the force feedback device. Teeth are displayed on the monitor, and the student can manipulate the joystick or explorer in such a way as to "feel" enamel, healthy dentin, and carious dentin. Different haptic responses are received when the joystick or explorer is manipulated over the appropriate areas of the tooth.

A dental simulator was developed to provide haptic feedback when the device being held by the user. The simulator's goal is to provide a learning experience resembling reality as described in Gal G. B., Weiss E. I., Gafni N. and Ziv A., "Preliminary assessment of faculty and student perception of a haptic virtual reality simulator for training dental manual dexterity", J. of Dental Education, vol. 75, no. 4, pp. 496-504, 2011. The system offers a stylus, with six degrees of freedom, attached to a stand that provides the holder with feedback based on a 3D image viewed on the screen.

Another dental simulation system was developed to improve dental students' transition from the preclinical laboratory to the clinic as described in Jasinevicius, T. R., Landers, M., Nelson, S. and Urbankova, A., "An evaluation of two dental simulation systems: virtual reality versus contemporary non-computer-assisted", J. of Dental Education, vol. 68, no. 11, pp. 1151-1162, 2004. The aim was to compare the efficacy of a VR computer-assisted simulation system with a contemporary non-computer-assisted simulation system. The objectives were to determine whether there were differences between the two systems in the quality of the students' preparations and the amount of faculty instruction time.

Currently, tool-tooth interaction in operative dentistry is largely taught and learned through the traditional novice-expert apprenticeship model. In this model, apprentices acquire the technical dental skills through years of hands-on training in dental clinics and laboratories, and receive supervision and feedback from their instructors. However, due to the lack of quantitative KPIs to assess aspects of dental skills, the knowledge acquired, and subsequently relayed through generations of dentists remains largely qualitative. As a result, trial and error often constitute a major part of learning psychomotor skills for a dental apprentice. With decreasing operating hours and training resources, there is an increasing demand to improve training efficiency and provide a quantitative evaluation of dental performance using KPIs.

In order to objectively assess technical dental skills, it is implicit that one must be able to measure and study essential aspects of dental performance and quantify KPIs. In order to effectively, yet safely, accomplish the dental procedure, the operators should know how to handle the handpiece (measuring position and orientation), recognize proper the amount of pressure exerted on the tooth, and understand the level of vibration when the dental handpiece is or is not in contact with the tissue (measuring acceleration and jerk). The tactile feedback that the dental tool generates, can vary depending on the tissue type, regions of the tooth, or particular dental task. In dental schools, dental laboratories, and clinics, this knowledge is often conveyed from the instructor to the apprentices through qualitative instructions, such as "be gentle", "go deeper" or "push harder". Therefore, quantitative vibrotactile data measured during the performance of dental tasks on human teeth remain largely unavailable.

SUMMARY OF THE INVENTION

Understanding the vibrotactile characteristics and proper dental tool handling has been made possible by this invention through embedding sensors and actuators onto dental tools and providing an effective augmented reality environment.

More particularly, the invention relates to a vibrotactile dental apparatus comprising two main setups connecting to each other through a wireless or wired communication network. The first setup (instructor workstation) comprises a set of sensory systems attached to a commercially-available dental tool that measures the position, orientation, velocities, accelerations, and jerk (vibrotactile characteristics) of the dental tool while the dental tool is in contact with a tooth physical model or with a tooth model in a software program. The second setup (apprentice workstation) includes a sensorized custom-designed training dental tool actuated by a set of embedded actuators, a set of sensory systems and a display displaying the dental operation performed at the instructor workstation while the apprentice workstation quantifies the key performance indices (KPIs) related to the task.

The invention is useful for pedagogical and professional purposes. The invention is used for training and educating dental apprentices and novice dentists in a clinical or laboratory setting. However, the application could be well extended to other fields of health sciences such as general surgery and neurosurgery where a drill is used to conduct a task. The invention also relates to a teaching method as well as its use for training purposes and emulating therapeutic strategies.

The invention provides the apprentice with tactile feedback by processing the data measured and/or obtained from the dental tool of the instructor workstation. The data include but are not necessarily limited to, the position, orientation, velocities, accelerations, and jerk components of the dental tool of the instructor workstation when a dental operation is conducted by the instructor. The invention, therefore, helps the apprentice understand and perceive how the instructor is conducting the dental operation and tasks with no need to be present at the instructor workstation. The apprentice perceives the feeling by means of a three-dimensional (3D) custom-designed training tool onto which some sensors and actuators are embedded. The invention is used in teaching mode and practicing mode. In the teaching mode, the invention provides the apprentices with the audio, visual and tactile feedback from the instructor workstation and helps the apprentices learn how to conduct dental tasks. In the practicing mode, the apprentices could use the invention to perform dental tasks to evaluate their dental performance skill using KPIs. In the practicing mode, the instructor can see the results of the students work.

According to one aspect of the invention there is provided a dental procedure training system for use with an instructor workstation comprising a dental tool having a handle grip arranged to be gripped in a hand of an instructor and a sensory system arranged to sense at least one operating characteristic of the dental tool while the dental tool performs a dental procedure, the training system comprising:

at least one apprentice workstation for use by an apprentice, the apprentice workstation comprising:
a custom-designed training tool having a handle grip representative of the handle grip of the dental tool so as to be arranged to be gripped in a hand of the apprentice;
a vibrotactile actuation system embedded in the training tool so as to generate vibrotactile feedback to the apprentice through the handle grip of the training tool;
a processing unit arranged to operate the vibrotactile actuation system of the training tool according to said at least one operating characteristic sensed by the sensory system of the instructor workstation.

The training tool of said at least one apprentice workstation preferably has a housing that is substantially identical in shape and size to a housing of the dental tool, and wherein the actuation system is supported internally within the housing.

When the handle grip of the training tool of said at least one apprentice workstation is substantially identical in shape and size to the handle grip of the dental tool, and wherein the actuation system is supported internally within the handle grip.

When the training tool of said at least one apprentice workstation extends longitudinally between a first end locating a tooltip which is representative of an operating end of the dental tool and an opposing second end, the actuation system is preferably supported internally within the training tool at an intermediate location which is spaced longitudinally inwardly from both of the first and second ends of the training tool.

When said at least one apprentice workstation further comprises a sensory system arranged to sense at least one operating characteristic of the training tool, the processing unit may be arranged to compare said at least one operating characteristic of the training tool to said at least one operating characteristic of the dental tool.

The sensory system of the training tool of said at least one apprentice workstation is preferably supported on to the training tool at a respective location which is substantially identical to a location of the sensory system on the dental tool.

The sensory system of said at least one apprentice workstation is preferably supported internally within a housing of the training tool.

Preferably the operating characteristics sensed by the sensory system of the training tool of said at least one apprentice workstation include vibrotactile characteristics generated by the actuation system.

The processing unit of said at least one apprentice workstation is preferably arranged to operate the actuation system by comparing vibrotactile characteristics sensed by the sensory system of the training tool to vibrotactile characteristics sensed by the sensory system of the dental tool.

The operating characteristics sensed by the sensory system of said at least one apprentice workstation preferably include performance characteristics determined by movement or position of the training tool under control by the apprentice.

The processing unit of said at least one apprentice workstation may be arranged to generate an alert if the performance characteristic sensed by the sensory system of the training tool deviates from a pre-defined acceptable range of performance characteristics stored on the processing unit.

The acceptable range may be defined by a threshold margin relative to a corresponding operating characteristic sensed by the sensory system of the dental tool.

The training tool of said at least one apprentice workstation may include a vibrator supported thereon for operation independently of the vibrotactile actuation system in which the processing unit of said at least one apprentice workstation is arranged to operate the vibrator in response to generating the alert. Preferably the vibrator is supported internally within the training tool.

The processing unit of said at least one apprentice workstation may be arranged to generate a graphical representation illustrating the comparison of said at least one operating characteristic of the training tool to said at least one operating characteristic of the dental tool.

The graphical representation may comprise video images representative of a position and an orientation of the training tool superimposed onto respective video images representative of a position and an orientation of the dental tool over a duration of the dental procedure.

The graphical representation is preferably arranged to be displayed on a display of said at least one apprentice workstation and/or on a display of the instructor workstation.

Preferably the processing unit of said at least one apprentice workstation is arranged to calculate at least one performance index using the operating characteristics sensed by the sensory system of the apprentice workstation and compare the calculated performance index to a corresponding performance characteristic of the instructor workstation. Said at least one performance index is preferably calculated using more than one sensed operating characteristic sensed by the sensory system of said at least one apprentice workstation, for example using operating characteristics including movement characteristics relating to a movement of the training tool. The movement characteristics of the training tool may include acceleration of the training tool and/or angular velocity of the training tool. Said at least one performance index may also be calculated using operating characteristics including position characteristics relating to a position of the training tool, such as the angular orientation of the training tool.

Preferably the operating characteristics sensed by the sensory system of said at least one apprentice workstation include position, orientation, velocities, accelerations, and/or jerk components of training tool along one, two, or three axes.

Said at least one apprentice workstation may include a base station having a training tool locator arranged to register an initial position and orientation of the training tool relative to the base station.

The training system in some instances includes a single apprentice workstation, yet in other instances includes a plurality of apprentice workstations.

The training system may be used in combination with the instructor workstation and a data transmission system in communication between the instructor workstation and said at least one apprentice workstation so as to be arranged to communicate the sensed at least one operating characteristic of the dental tool with the processing unit of said at least one apprentice workstation.

Preferably apprentice workstation further comprises a sensory system arranged to sense at least one operating characteristic of the training tool, in which the processing unit is arranged to compare said at least one operating characteristic of the training tool to said at least one operating characteristic of the dental tool in real time during the dental procedure performed by the dental tool.

When the instructor workstation further comprises a video capturing system arranged to capture video images of the dental tool performing said dental procedure, preferably said at least one apprentice workstation comprises a display arranged to display the video images of the dental tool performing the dental procedure.

When the training system includes a recording system arranged to store the video images captured by the video capturing system along with the sensed at least one operating characteristic of the dental tool performing the dental procedure and replay the stored video images along with the sensed at least one operating characteristic subsequent to the dental procedure, preferably the processing unit is arranged to compare said at least one operating characteristic sensed by the sensory system of the training tool to said at least one operating characteristic of the dental tool while replaying the stored video images.

The sensory system of the instructor workstation and the sensory system of said at least one apprentice workstation may comprise accelerometers arranged to measure accelerations and jerks.

The sensory system of the instructor workstation and the sensory system of said at least one apprentice workstation may comprise gyros arranged to measure angular velocities.

The sensory system of the instructor workstation and the sensory system of said at least one apprentice workstation may comprise inertial sensors including gyros, accelerometers, and/or magnetometers to measure orientations.

The sensory system of the instructor workstation and the sensory system of said at least one apprentice workstation may comprise inertial sensors including gyros and accelerometers and any combination of inertial sensors with ultrawideband systems, or cameras to measure positions.

The sensory system of the instructor workstation and the sensory system of said at least one apprentice workstation may comprise a combination of accelerometers, magnetometers, gyros, ultrawideband systems, and cameras.

The sensory system of the instructor workstation and the sensory system of said at least one apprentice workstation may be arranged to measure the position, orientation, velocities, accelerations, and jerk components along three Cartesian axes that are orthogonal to each other.

The sensory system of the instructor workstation and the sensory system of said at least one apprentice workstation may be arranged to measure the position, orientation, velocities, accelerations, and jerk components along any one of polar, cylindrical, spherical, homogeneous, or curvilinear coordinate systems.

When the instructor workstation includes a rheostat arranged to control the operation of the dental tool, the sensory system of the instructor workstation preferably comprises potentiometers, strain gauges, load cells, force sensors, or resistance-based sensors to measure an engagement level or a disengagement level of the rheostat.

When the processing unit of said at least one apprentice workstation is arranged to calculate at least one performance index using the operating characteristics sensed by the sensory system of the apprentice workstation, the instructor workstation may further comprise a rheostat arranged to control an operation of the dental tool, a video capturing system arranged to capture video images of the dental tool performing said dental procedure, and a recording system arranged to store in a data storage system: (i) the video images captured by the video capturing system, (ii) the sensed at least one operating characteristic of the dental tool performing the dental procedure, (iii) said at least one performance index calculated by the processing unit of said at least one apprentice workstation, and (iv) an operational status of the rheostat.

According to another independent aspect of the present invention there is provided a method of use of the training system as described above to generate vibrotactile feedback using vibrotactile actuator of said at least one apprentice workstation while the handle grip is held in the hand of the apprentice such that the apprentice senses the vibrotactile feedback through the handle grip of the training tool of the apprentice workstation which mimics vibrotactile feedback felt by the instructor using the dental tool to perform the dental procedure.

According to another independent aspect of the present invention there is provided a dental procedure training system for use with an instructor workstation comprising a dental tool having a handle grip arranged to be gripped in a hand of an instructor and a sensory system arranged to sense at least one operating characteristic of the dental tool while the dental tool performs a dental procedure, the training system comprising:

at least one apprentice workstation for use by an apprentice, the apprentice workstation comprising:
    a training tool which is operational to perform said dental procedure, the training tool having a handle grip representative of the handle grip of the dental tool so as to be arranged to be gripped in a hand of the apprentice;
    a sensory system arranged to sense at least one operating characteristic of the training tool while the training tool performs said dental procedure;
    a processing unit arranged to compare said at least one operating characteristic sensed by the sensory system of the apprentice workstation with said at least one operating characteristic sensed by the sensory system of the instructor workstation.

The operating characteristics sensed by the sensory system of said at least one apprentice workstation may include performance characteristics determined by movement or position of the training tool under control by the apprentice.

The processing unit of said at least one apprentice workstation may be arranged to generate a graphical representation illustrating the comparison of said at least one operating characteristic of the training tool to said at least one operating characteristic of the dental tool.

The graphical representation may comprise video images representative of a position and an orientation of the training tool superimposed onto respective video images representative of a position and an orientation of the dental tool over a duration of the dental procedure.

The graphical representation may be arranged to be displayed on a display of said at least one apprentice workstation.

The processing unit of said at least one apprentice workstation may be arranged to calculate at least one performance index using the operating characteristics sensed by the sensory system of the apprentice workstation and compare the calculated performance index to a corresponding performance characteristic of the dental tool.

The at least one performance index may be calculated using more than one sensed operating characteristic sensed by the sensory system of said at least one apprentice workstation.

In one example, the performance index is calculated using operating characteristics including movement characteristics relating to a movement of the training tool, for example an acceleration of the training tool and/or an angular velocity of the training tool.

Alternatively or in addition to the example noted above, the at least one performance index may be calculated using operating characteristics including position characteristics relating to a position of the training tool and/or an angular orientation of the training tool.

The operating characteristics sensed by the sensory system of said at least one apprentice workstation may include position, orientation, velocities, accelerations, and/or jerk components of the training tool along one, two, or three axes.

The at least one apprentice workstation may include a base station having a training tool locator arranged to register an initial position and orientation of the training tool relative to the base station.

The training system in some instances includes a single apprentice workstation, yet in other instance may include a plurality of apprentice workstations.

When used with an instructor workstation including a recording system arranged to record the sensed at least one operating characteristic of the dental tool performing the dental procedure, the training system may further include a data storage system arranged to communicate with the recording system and to store the sensed at least one operating characteristic of the dental tool performing the dental procedure recorded by the recording system, and a data transmission system arranged for communication between the data storage system and said at least one apprentice workstation so as to be arranged to communicate the sensed at least one operating characteristic of the dental tool to the processing unit of said at least one apprentice workstation.

When the training system further includes a data storage system, and a data transmission system arranged for communication between the data storage system, the processing unit of said at least one apprentice workstation may be arranged to calculate at least one performance index using the operating characteristics sensed by the sensory system of the apprentice workstation and transmit the calculated at least one performance index over the data transmission system for storage onto the data storage system.

When the instructor workstation has a processing unit arranged to calculate at least one performance index using the at least one operating characteristic sensed by the sensory system of the instructor workstation and a recording system arranged to record the at least one performance index, the training system may further include a data storage system arranged to store the calculated at least one performance index relating to the dental tool performing the dental procedure recorded by the recording system, and a data transmission system arranged for communication between the data storage system and said at least one apprentice workstation so as to be arranged to communicate the at least one performance index calculated by the instructor workstation to the processing unit of said at least one apprentice workstation.

When the instructor workstation has a rheostat arranged to control operation of the dental tool in which the sensory system of the instructor workstation is arranged to sense a condition of the rheostat of the instructor workstation, and a recording system to record the condition of the rheostat of the instructor workstation, the training system may further comprise (a) a data storage system arranged to store the condition of the rheostat of the dental tool performing the dental procedure recorded by the recording system, (b) a data transmission system arranged for communication between the data storage system and said at least one apprentice workstation so as to be arranged to communicate the condition of the rheostat of the instructor workstation to the processing unit of said at least one apprentice workstation, and (c) a rheostat arranged to control operation of the training tool, in which the sensory system of the apprentice workstation is arranged to sense a condition of the rheostat of the apprentice workstation, and the processing unit of said at least one apprentice workstation is arranged to compare the condition of the rheostat of the apprentice workstation to the condition of the rheostat of the instructor workstation and display a result of the comparison.

When the instructor workstation has a video capturing system arranged to capture video images of the dental tool performing said dental procedure, the training system may further comprise a data storage system arranged to store the captured video images and a data transmission system arranged for communication between the data storage system and said at least one apprentice workstation so as to be arranged to communicate the captured video images of the instructor workstation and the sensed at least one operating characteristic of the dental tool to the processing unit of said at least one apprentice workstation, in which said at least one apprentice workstation comprises a display arranged to replay the video images of the dental tool performing the dental procedure while the apprentice operates the training tool subsequent to the dental procedure performed by the instructor. The processing unit of said at least one apprentice workstation may be arranged to replay the video images of the dental tool performing the dental procedure and display the sensed at least one operating characteristic of the dental tool along with the video images. The processing unit of said at least one apprentice workstation may also be arranged to generate a graphical representation on the display of the apprentice workstation which illustrates a comparison of said at least one operating characteristic of the training tool to said at least one operating characteristic of the dental tool. The graphical representation may comprise video images representative of a position and an orientation of the training tool superimposed onto the captured video images of the dental tool which represent of a position and an orientation of the dental tool over a duration of the dental procedure.

The sensory system of said at least one apprentice workstation may comprise accelerometers arranged to measure accelerations and jerks.

The sensory system of said at least one apprentice workstation may comprise gyros arranged to measure angular velocities.

The sensory system of said at least one apprentice workstation may comprise inertial sensors including gyros, accelerometers, and magnetometers to measure orientations.

The sensory system of said at least one apprentice workstation may comprise inertial sensors including gyros and accelerometers and any combination of inertial sensors with ultrawideband systems, or cameras to measure positions.

The sensory system of said at least one apprentice workstation may comprise a combination of accelerometers, magnetometers, gyros, ultrawideband systems, and cameras.

The sensory system of said at least one apprentice workstation may be arranged to measure the position, orientation, velocities, accelerations, and jerk components along three Cartesian axes that are orthogonal to each other.

The sensory system of said at least one apprentice workstation may be arranged to measure the position, orientation, velocities, accelerations, and jerk components along any one of polar, cylindrical, spherical, homogeneous, or curvilinear coordinate systems.

The at least one apprentice workstation may comprise a rheostat arranged to control the operation of the training tool, in which the sensory system of said at least one apprentice workstation comprises potentiometers, strain gauges, load cells, force sensors, or resistance-based sensors to measure an engagement level or a disengagement level of the rheostat.

According to another independent aspect of the present invention, there is provided a method of use of the training system described above in which said at least one operating characteristic sensed by the sensory system of the instructor workstation has been recorded on a data storage system of the training system. In this instance the method may further comprise using the training tool of said at least one apprentice workstation to perform the dental procedure subsequent to use of the dental tool of the instructor workstation to perform the dental procedure, and comparing said at least one operating characteristic sensed by the sensory system of the apprentice workstation with said at least one operating characteristic stored in the data storage system while the training tool of the apprentice workstation is used to perform the dental procedure.

When video images of the dental tool of the instructor workstation performing the dental procedure have been recorded on the data storage system of the training system, the method may further include displaying the video images stored on the data storage system while using the training tool of said at least one apprentice workstation to perform the dental procedure.

According to another independent aspect of the present invention, there is provided a method of use of the training system as described above in which the dental procedure includes endodontics, prosthodontics, operative work, restorative work, or periodontics work.

According to another independent aspect of the present invention, there is provided a method of use of the training system as described above in which the procedure includes anyone, or all, of piercing, cutting, forming hard, and soft tissues.

According to another independent aspect of the present invention there is provided a vibrotactile dental apparatus to measure and generate vibrotactile characteristics including the position, orientation, velocities, accelerations, and jerk components of a dental tool interacting with a physical tooth, while transferring vibrotactile, video, and audio data from an instructor workstation to a number of apprentices workstations for teaching purposes.

The vibrotactile dental apparatus may include an instructor workstation and one or more apprentice workstations.

The instructor workstation may comprise:
a set of sensory systems mounted onto a dental tool to measure vibrotactile characteristics of a dental task conducted by an instructor in a classroom, clinic or laboratory;
a sensor used to measure engagement or disengagement level of the rheostat;
an audiovisual recording system;
a processing unit, comprising (i) a main processor and (ii) software comprising a graphical user interface for interacting with apprentices; for analyzing data of said sensory system, sensor, and audiovisual data; and for displaying and storing said KPIs of each apprentice graphically and statistically.

Each apprentice workstation may comprise:
a custom-designed training tool, comprising (i) a vibrotactile actuation system to emulate vibrotactile characteristics of the dental task conducted in said instructor workstation, (ii) a vibrator to apply abrupt forces to the apprentice's hand, and (iii) a set of sensory systems mounted onto the custom-designed training tool to measure vibrotactile characteristics of a dental task generated by said actuation system;
a processing unit, comprising (i) a main processor, (ii) a set of interfacing boards for interaction among said processor, vibrotactile actuation system, vibrator, and sensory system, (iii) a display to interact with said software and to render the augmented reality environment, (iv) software for interacting with said instructor; for analyzing data of said sensory system to calculate KPIs; for generating control inputs to run said vibrotactile actuation system and said vibrator; for displaying and storing the performance of the apprentice graphically and statistically based on pre-defined KPIs; and for creating and demonstrating the augmented reality environment based on the video taken from said instructor workstation and 3D model of said custom-designed training tool, and (v) a platform to register the initial posture of the custom-designed training tool.

The system preferably also includes (i) a data transmission system to communicate between said instructor workstation and said apprentice workstations in a multilateral fashion; and (ii) a data storage system to store data measured and analyzed at instructor and apprentices workstations.

According to another independent aspect of the present invention, there is provided a vibrotactile dental apparatus, for practicing purposes, to measure an apprentice's dental skill by comparing vibrotactile characteristics of a dental tool, held by the apprentice, interacting with a physical tooth to those of the instructor.

The apparatus in this instance preferably comprises:
a data storage system arranged to retrieve data stored from the instructor's performance according to any above-noted aspect of the invention and to store all data collected;
a data transmission system to communicate between an apprentice workstation and said data storage system in a bilateral fashion; and
an apprentice workstation comprising:
a set of sensory systems mounted onto a dental tool to measure vibrotactile characteristics of a dental task conducted by said apprentice;
a sensor used to measure engagement or disengagement level of the rheostat;
a processing unit comprising (i) a main processor, (ii) a display to interact with said software and to render the augmented reality environment, and (iii) software for communicating with said data storage system in a bilateral fashion; for displaying and storing the performance of said apprentice graphically and statistically; for retrieving audiovisual and vibrotactile data, from said data storage system; for analyzing data of said sensory system and said sensor to calculate KPIs; and for creating said augmented reality environment; and
a platform to register the initial posture of the custom-designed training tool.

According to another independent aspect of the present invention, there is provided a method of training dental apprentices using the apparatus according to any aspect of the invention noted above, including the steps of:
employing said dental unit and said dental tool for the performance of dental tasks by the instructor;
mounting said sensory system onto said dental tool by the instructor;
running said software by the instructor and each apprentice;
sending access request by each said apprentice to said instructor workstation;
authenticating apprentices' access request by the instructor and sending confirmation to each said apprentice's workstation;
conducting initialization and registration by the instructor and each apprentice;
conducting dental task by the instructor;
employing an audiovisual recording system by the instructor to record audio and video data;
employing said sensory system and said sensor by the instructor for recording vibrotactile data related to the dental task;
sending the vibrotactile and audiovisual data to each apprentice workstation and to said data storage system;
employing said vibrotactile actuation system at each apprentice workstation to emulate the vibrotactile characteristics based on data received from said instructor workstation and analyzed in said software;
employing said sensory system located inside said custom-designed training tool to measure vibrotactile characteristics generated by said actuation system at each apprentice workstation;
employing said software at each apprentice workstation to receive audio and video from said instructor workstation; to superimpose 3D model of said custom-designed training tool onto video; and to calculate KPIs and send them to said instructor workstation;
employing said data storage system to store KPIs, audiovisual, and vibrotactile data;
employing a display for demonstrating the augmented reality environment during a teaching session at said apprentice workstation; and employing said vibrator to apply abrupt force to each apprentice's hand according to calculated KPIs and acceptable ranges of KPIs.

According to another independent aspect of the present invention, there is provided a method of training dental apprentices using the apparatus according to any aspect of the invention noted above, including the steps of:
- employing said dental unit and said training tool which is operational to perform the dental procedure by said apprentice;
- mounting said sensory system onto said training tool by said apprentice;
- running said software by said apprentice;
- conducting initialization and registration by said apprentice;
- conducting dental task by said apprentice;
- employing said sensory system and said sensor by the apprentice for recording vibrotactile data related to the dental task;
- employing said software at said apprentice workstation to receive said vibrotactile data and said audiovisual data, recorded by said instructor, from said data storage system; to superimpose 3D model of said training tool onto video; and to calculate KPIs and compare the outcomes with those of instructor workstation;
- employing a display for demonstrating the augmented reality environment during the practicing session at said apprentice workstation; and
- employing said data storage system to store vibrotactile data and KPIs related to dental tasks conducted by said apprentice.

According to another independent aspect of the present invention, there is provided an apparatus wherein the dental apprentice perceives vibrotactile characteristics related to dental task conducted by said instructor at said instructor workstation.

According to another independent aspect of the present invention, there is provided an apparatus wherein the dental performance skill of the apprentice is assessed with reference to vibrotactile data received from said instructor workstation.

According to another independent aspect of the present invention, there is provided a kit comprising the dental training tool according to any aspect of the present invention noted above and a sheet of instructions for use thereof.

Although the invention is used for the field of dentistry, the application could be well extended to other fields such as general surgery and neurosurgery where a drill is used to conduct a task.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

The invention augments conventional dental tools (such as rotary handpieces) with a set of sensory and actuation systems to provide dental apprentices with a set of important information, including the position, orientation, velocities, accelerations, and jerk of the dental tasks such as filling in restorative dentistry. While the handpiece in the instructor's workstation is instrumented by sensory systems and an audiovisual recording system, a data processing unit receives, analyses and then transfers the information to each apprentice's workstation in the classroom or preclinical laboratory. Each apprentice holds a sensorized custom-designed training tool that is instrumented by the second set of sensory systems and is actuated by embedded actuators along different directions. In each apprentice's workstation, datasets measured in both instructor and apprentices' workstations are compared, analyzed and then plotted on a display, and a set of KPIs is computed based on the deviation between the two datasets. The display also shows the actual video of the instructor's tool and the 3D model of the apprentice custom-designed training tool to provide the apprentice with the opportunity of learning dental tasks in proper postures. In summary, the invention improves the training and learning process of dental treatment through sensorimotor (audio, visual and haptic) interactions, such that the fine motor skills that are imparted by the instructors to the dental hygiene and dental students. Moreover, the invention offers a practicing mode which enables apprentices to practice dental tasks without the need for supervision.

Figure 1:
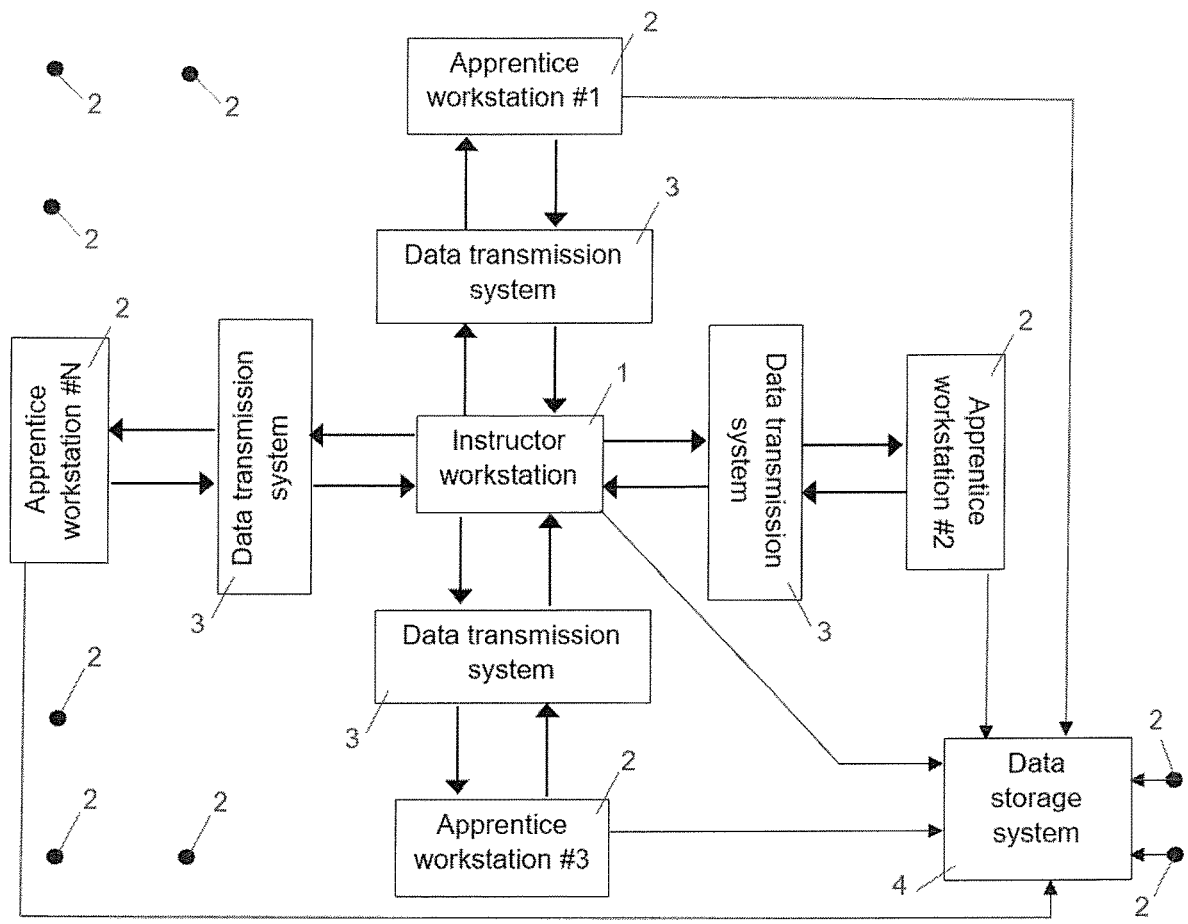
FIG. 1 shows the overall scheme of the apparatus that consists of instructor workstation, a number of apprentice workstations, a data transmission system, and a data storage system along with overall workflow of main components of the invention.

FIG. 1 presents the overall scheme of the apparatus. Said instructor workstation 1 is the location where an instructor is situated to conduct different dental tasks. The instructor communicates with each said apprentice workstation 2 through the data transmission system 3. Said data transmission system 3 can be a local network-based or a wired or wireless internet-based connection. During the performance of the dental tasks, data including data of sensory systems of the instructor and apprentices workstations as well as audiovisual recordings taken from the instructor workstation 1 are stored in said data storage system 4 for further purposes including for the use by apprentices in the practicing mode or, for evaluation of apprentice's performance by the instructor in both teaching mode and practicing mode. The data storage system 4 can be a hardware storage system located in the classroom or any cloud-based storage system. The data stored in the data storage system 4 include video and audio data of the task environment while a dental task is performed by the instructor in the teaching mode, physical data measured by sensory systems of the instructor workstation 1 and the apprentices workstations 2 in both modes as well as KPIs defined for evaluating apprentices' performance.

Figure 2:
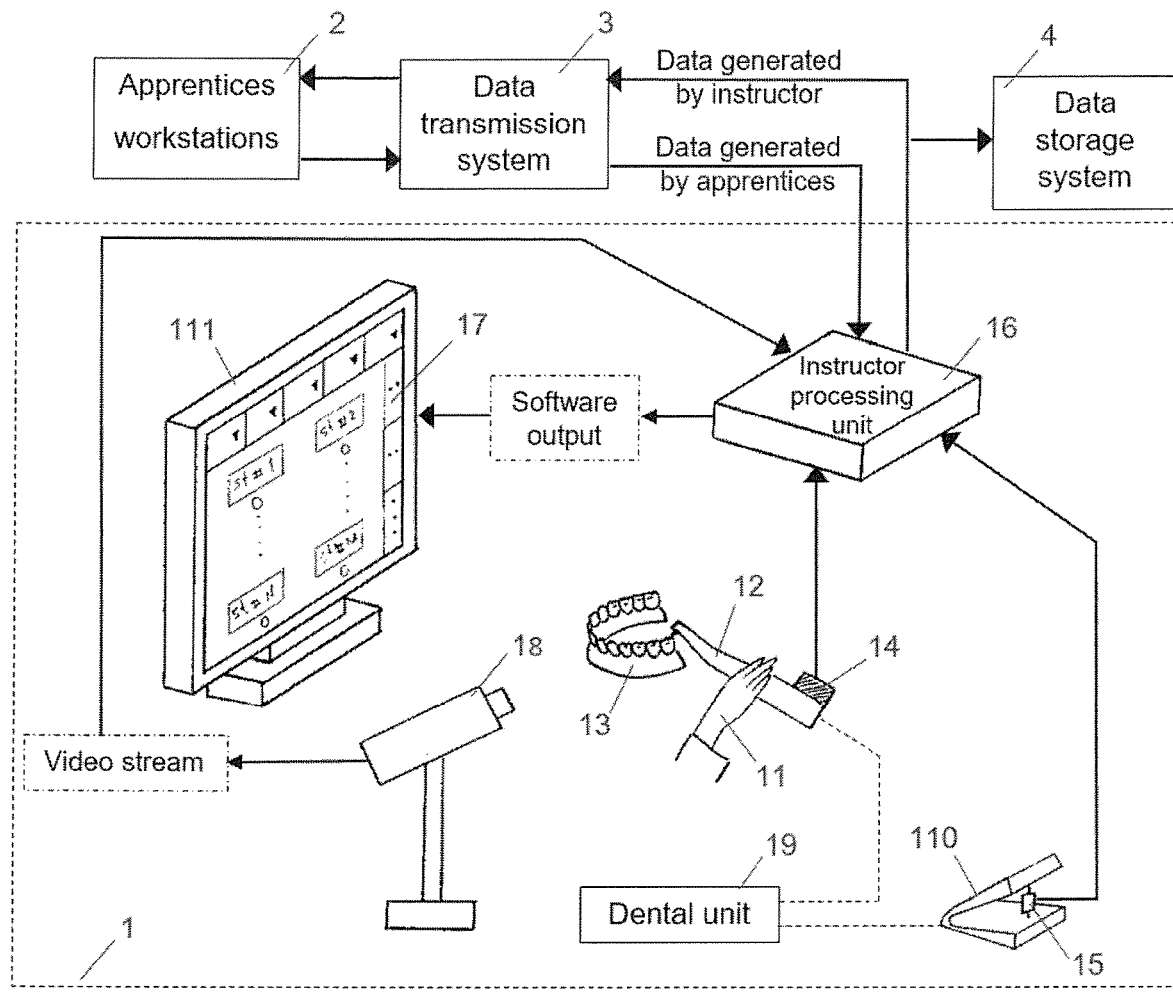
FIG. 2 shows the elements used in the instructor workstation that include a dental unit, a rheostat, a processing unit, tooth physical model, a dental tool, a set of sensory systems to measure vibrotactile data of the dental tool, a sensor to measure rheostat data, an audiovisual recording system, a software, and a display.

FIG. 2 shows details on the apparatus used in the instructor workstation 1 along with its workflow. A dental task is conducted by said instructor 11 using a dental tool 12 on a tooth physical model 13. Said instructor processing unit 16 includes the main processor responsible for: (i) Receiving and analyzing data of said sensory system 14 and sensor 15, recorded during performance of the dental task by the instructor; (ii) Recording video and audio that are taken from the audiovisual recording system 18; (iii) Communicating with the apprentices workstations 2 and the data storage system 4 via the data transmission system 3; and (iv) Providing the instructor with user-friendly software 17 designed for teaching different dental tasks which is screened on the display 111.

Said software 17 enables the instructor to choose different options including the teaching session along with the time and date as well as type of the dental task. Each set of apprentices KPIs is displayed graphically on the screen located at the instructor workstation 1, which helps the instructor monitor each apprentice's performance during the teaching session. Another feature of the software 17 is to authenticate each apprentice's access request when they are present in the classroom. In addition, the software 17 provides the instructor with detailed statistical and graphical reports on each apprentice's performance. Sensory system 14 is a package including both sensor and data communication system which can be a wired or wireless system capable of transferring sensor data to the instructor processing unit 16. Sensory system 14 can be mounted onto various tools 12 including surgical drills and dental handpieces. Data taken from the sensory system 14 includes gyro and acceleration data in 3D as well as the magnetometer data. Sensor 15, mounted onto said rheostat 110 of the dental unit 19, measures engagement or disengagement level of the rheostat 110 during the dental operation.

Figure 3:
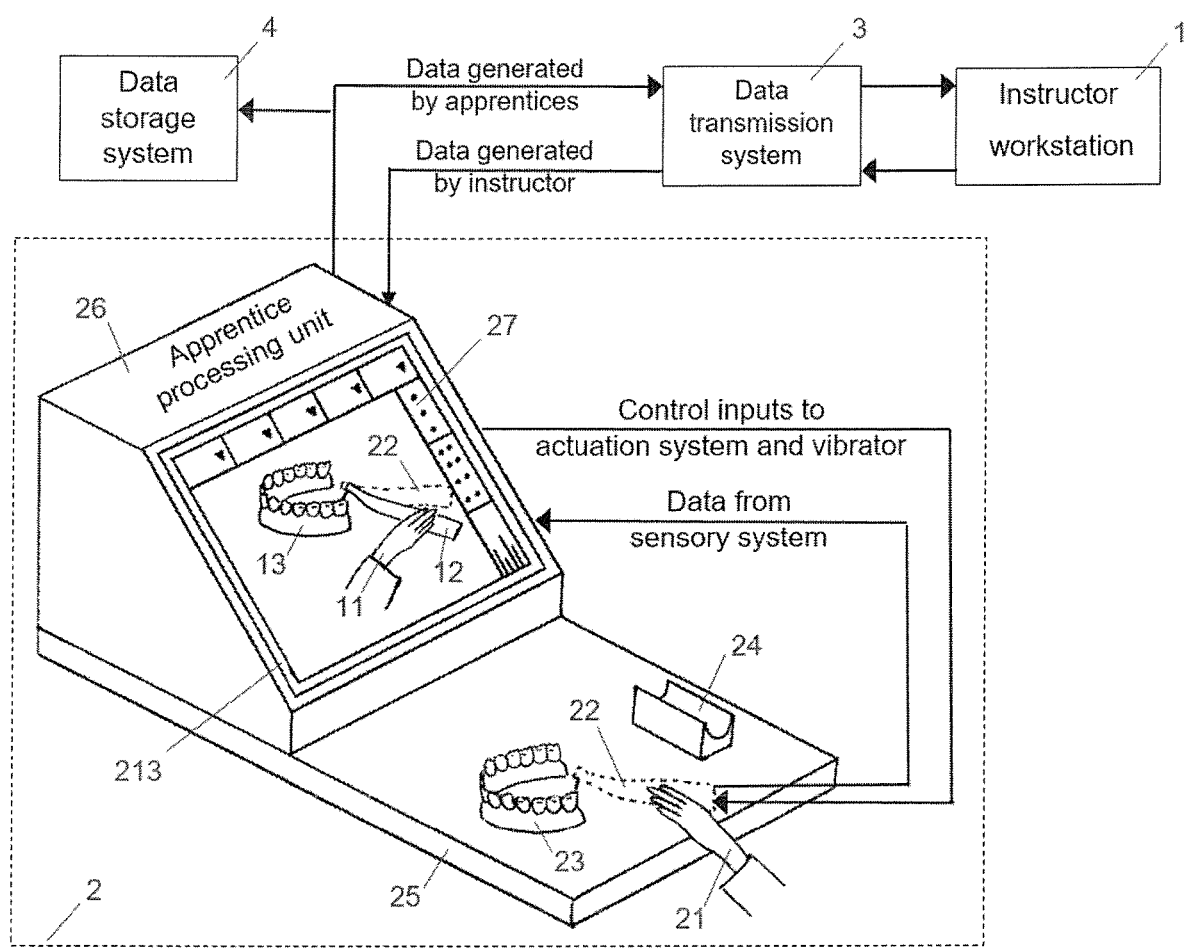
FIG. 3 illustrates the components of the apprentice workstation, for teaching purpose, including a processing unit, a display, software, a custom-designed training tool with a tip which is not operational to perform the dental task, a tooth physical model, and a framework designed for initialization and registration of the setup.

FIG. 3 illustrates different components used in each apprentice workstation 2. Said apprentice 21 holds a said custom-designed training tool 22 on a tooth physical model 23, which is similar to the tooth model 13 used in the instructor workstation 1. Said tool holder 24 and tooth physical model 23 are mounted onto a platform 25 for initialization and registration purposes. Said apprentice processing unit 26 provides each apprentice with a user-friendly software designed for the teaching mode.

In the teaching mode, the processing unit 26 is responsible for (i) Receiving and analyzing data of sensory system 221 located inside the custom-designed training tool 22; (ii) Communicating with both instructor workstation 1 and the data storage system 4 via the data transmission system 3; (iii) Generating control inputs for said vibrotactile actuation system 222 and said vibrator 223 that are located inside the custom-designed training tool 22, based on data of sensory system 14 and sensor 15 received from the instructor workstation 1 through data transmission system 3; (iv) Displaying video and audio recordings, which include the instructor's hand 11, instructor tool 12 and instructor tooth physical model 13 received from the instructor workstation 1 through the data transmission system 3 in a real-time fashion; (v) Superimposing 3D model of the custom-designed training tool 22 onto the video in an augmented reality environment screened on the display 213, and moving the 3D model using processed data of sensory system 221; (vi) Calculating KPIs for evaluation of each apprentice's performance during the teaching session based on the data taken from said sensory system 221; (v) Sending KPIs of each apprentice to the instructor workstation 1 and data storage system 4 via the data transmission system 3.

Said apprentice software 27 enables each apprentice to send a request to the instructor for getting access to data taken from the instructor workstation 1 during the dental operation. Moreover, the apprentice software 27 helps the apprentices monitor their own KPIs during the teaching session graphically, and receive detailed statistical reports on how effective they could follow the dental task in the teaching mode. Sensory system 221 is the same as the sensory system 14 used in the instructor workstation 1. Said vibrotactile actuation system 222 is responsible for generating the vibration on apprentice's hand to emulate the instructor's tactile feeling during the dental operation. Said vibrator 223 plays the role of a haptic device for alarming the apprentice when their KPIs exceed the pre-defined acceptable ranges.

Figure 4:
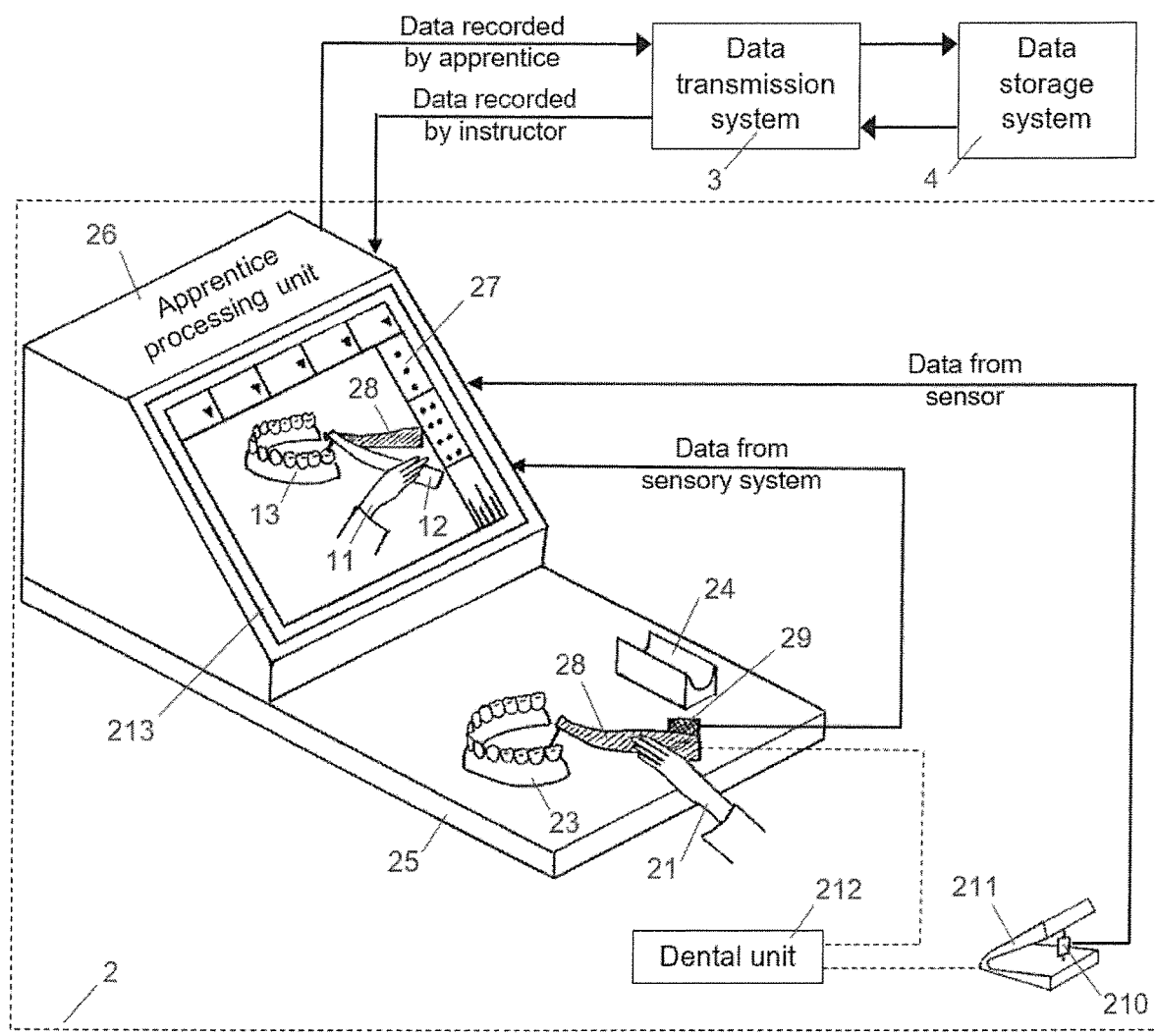
FIG. 4 depicts the components of the apprentice workstation, for practicing purpose, including a processing unit, a display, software, a training tool which is operational to perform the dental task, a dental unit, a rheostat, a tooth physical model, a set of sensory systems to measure vibrotactile data of the training tool, a sensor to measure rheostat data and a framework designed for initialization and registration of the setup.

FIG. 4 shows the apprentice workstation 2 in the practicing mode. The tooth physical model 23, tool holder 24 and platform 25 are the same as the ones described in FIG. 3. In the practicing mode, the training tool 28, the same as the dental tool 12 used by the instructor in the teaching mode, is employed. Said sensory system 29 is the same as the sensory system 14 and is mounted onto the training tool 28. Said sensory system 210 is the same as the sensor 15 and is mounted onto the rheostat 211 of the dental unit 212. The dental unit 212 is the same as the dental unit 19 in the teaching mode. The rheostat 211 is also the same as the rheostat 110 in the teaching mode.

In the practicing mode, the apprentice processing unit 26 is responsible for: (i) Receiving and analyzing data of sensory system 29 and sensor 210; (ii) Communicating with said data storage system 4 through said data transmission system 3 and receiving video, audio, and sensory data already stored by the instructor during the teaching mode; (iii) Displaying the video of the dental task, that is already performed by the instructor in the teaching mode, using said software 27 on the display 213; (iv) Superimposing 3D model of the training tool 28 onto the video, in an augmented reality environment, during the performance of a dental task by the apprentice in the practicing mode; and (v) Calculating KPIs of the apprentice 21 based on both data taken from sensory system 29, sensor 210 and data of the instructor workstation that are already stored in the data storage system 4.

Said software 27 displays the KPIs of the apprentice 21 graphically during the performance of a dental task in the practicing mode. Said software 27 also generates statistical and graphical reports on the performance of the dental task by the apprentice in the practicing mode and pushes the results of the report to the data storage system 4 via the data transmission system 3 to be accessible by the instructor for the evaluation purpose.

Figure 5:
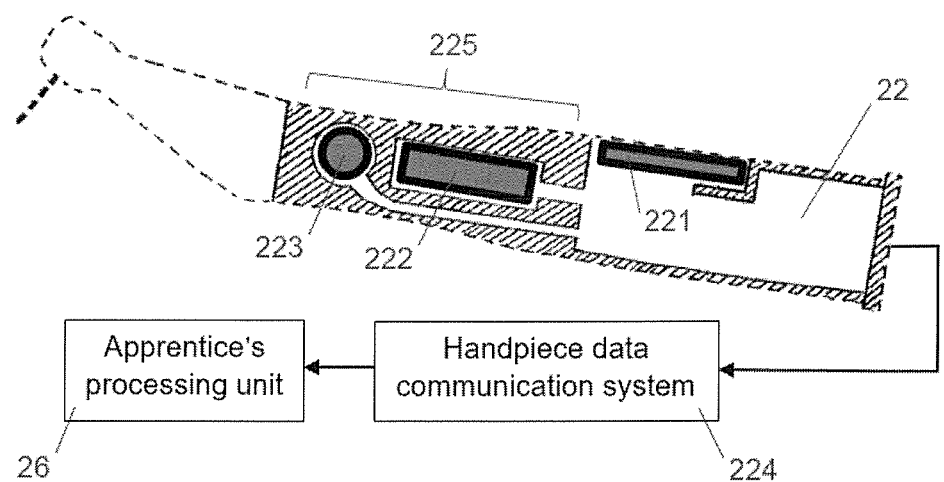
FIG. 5 illustrates the custom-designed training tool having a handle grip associated with its components including an actuation system to generate vibrotactile feeling at the apprentice workstation, a vibrator to apply an abrupt force to the apprentice's hand as an alarm, and a set of sensory systems along with the data communication system.

FIG. 5 details the structure of the custom-designed training tool 22 used by the apprentice in the teaching mode. Said training tool 22 includes said sensory system 221 responsible for measuring acceleration and gyro data in 3D as well as the magnetometer data when following the dental task conducted by the instructor. The training tool 22 is also equipped with a vibrotactile actuation system 222 and a vibrator 223. Said vibrotactile actuation system 222 is used to generate the tactile perception on the apprentice's hand holding the training tool 22 at handle grip 225 area. Said vibrator 223 is a vibration motor used to apply an abrupt force to the apprentice's hand when the apprentice does not follow the dental task properly based on pre-defined acceptable ranges of KPIs. Sensory system 221, vibrotactile actuation system 222, and vibrator 223 communicate with the apprentice processing unit 26 via a data communication system 224 which can be a wired or wireless communication system.

Figure 6:
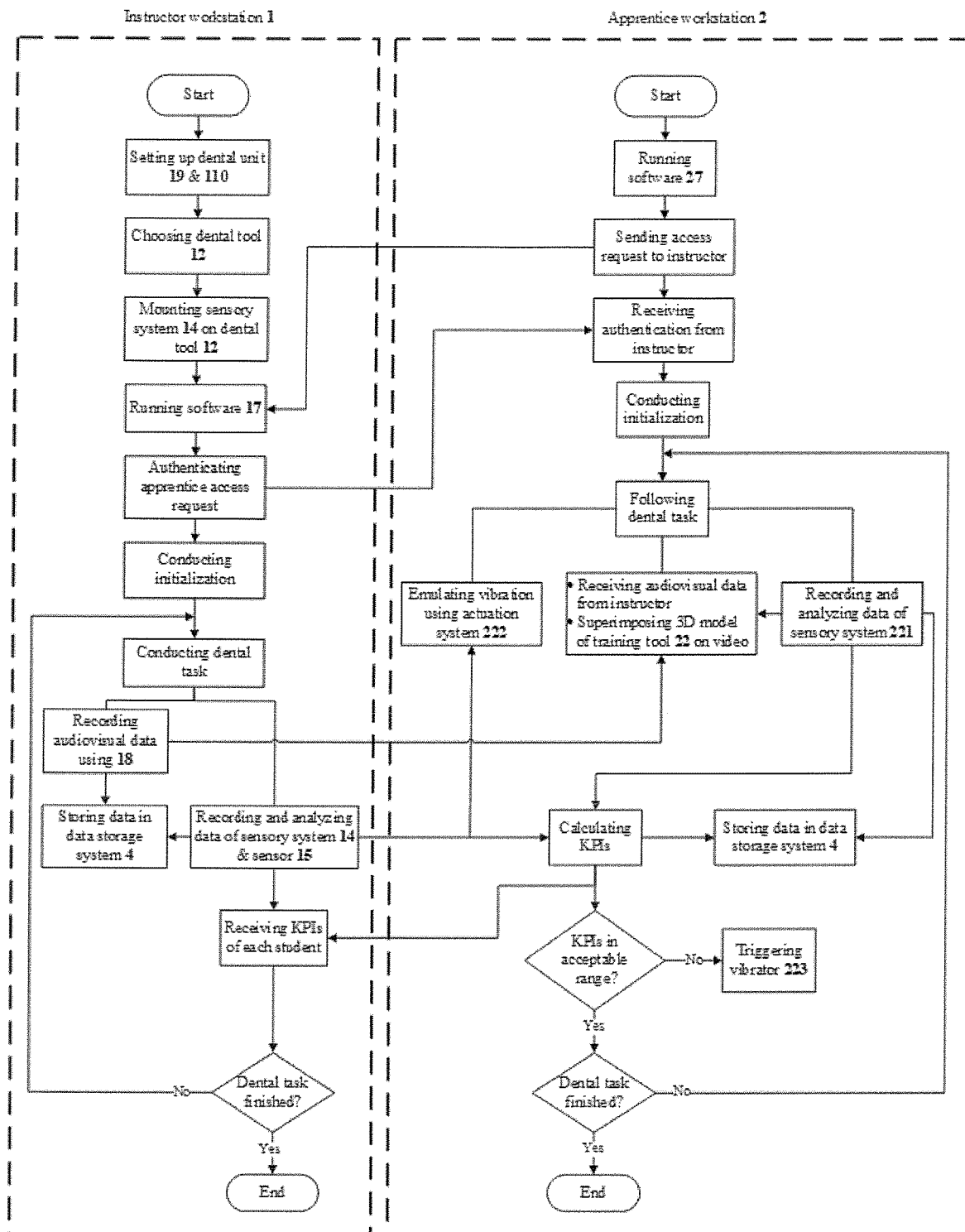
FIG. 6 shows the workflow indicating the steps defined to perform the teaching mode.

FIG. 6 illustrates the procedure followed in the teaching mode. Said instructor 11 sets up the dental unit 19 and the rheostat 110 and chooses the appropriate training tool 12 for the specific dental operation. Then, the instructor 11 mounts said sensory system 14 on the training tool 12, runs the software 17 and chooses the session information and type of the dental task from the software 17 menus. On each apprentice workstation, the apprentice 21 runs the software 27 and sends the access request to the instructor processing unit 16 via the data transmission system 3. The instructor 11 authenticates each apprentice access request by sending a confirmation message to each apprentice workstation 2. Once the authentication is completed, all apprentices 21 and the instructor 11 conduct an initialization step according to the instruction manual. Having done the initialization step, the instructor 11 begins conducting the dental task, the video and audio of the task are recorded using the audiovisual recording system 18. Moreover, the data of sensory system 14 and sensor 15 are measured and analyzed, and the processed data are sent to each apprentice workstation 2 via the data transmission system 3 in a real-time fashion. In addition, all sensory data and audiovisual recordings are stored in the data storage system 4 for further purposes that are described in the practicing mode (FIG. 7).

Having transferred all data to the apprentices workstations 2, three events occur in the apprentices workstations 2 concurrently: (i) Event 1: Said vibrotactile actuation system 222 starts operating by receiving control inputs from the software 27, (ii) Event 2: Data of the sensory system 221 are measured and analyzed, and (iii) Event 3: The video frames received from the instructor workstation 1 are displayed using software 27 at each apprentice display 213, and the 3D model of the apprentice custom-designed training tool 22 are superimposed and moved onto the video, in an augmented reality environment, using the analyzed data in the Event 2.

By measuring and analyzing data of sensory system 221 and having the corresponding data from the sensory system 14 of the instructor workstation 1, KPIs are defined which are used to evaluate each apprentice's performance during the teaching mode. If the KPIs are not in the pre-defined acceptable ranges, the vibrator 223 triggers and applies an abrupt force to the apprentice's hand 12 and alarms the apprentice that the way of holding the custom-designed training tool 22 is incorrect and out of acceptable ranges. In parallel, the KPIs are sent to the instructor workstation 1 and stored in the data storage system 4 for further analyses. Once the instructor 11 receives each apprentice's KPIs, the results are graphically shown on the screen of software 17. The goal is to allow the instructor to monitor apprentices' attention to the dental operation and score the dental performance in the teaching mode. This procedure is repeated until the performance of the dental task is completed by the instructor 1. All recorded and analyzed data will then be accessible as detailed reports for apprentices 21 and the instructor 11.

Figure 7:
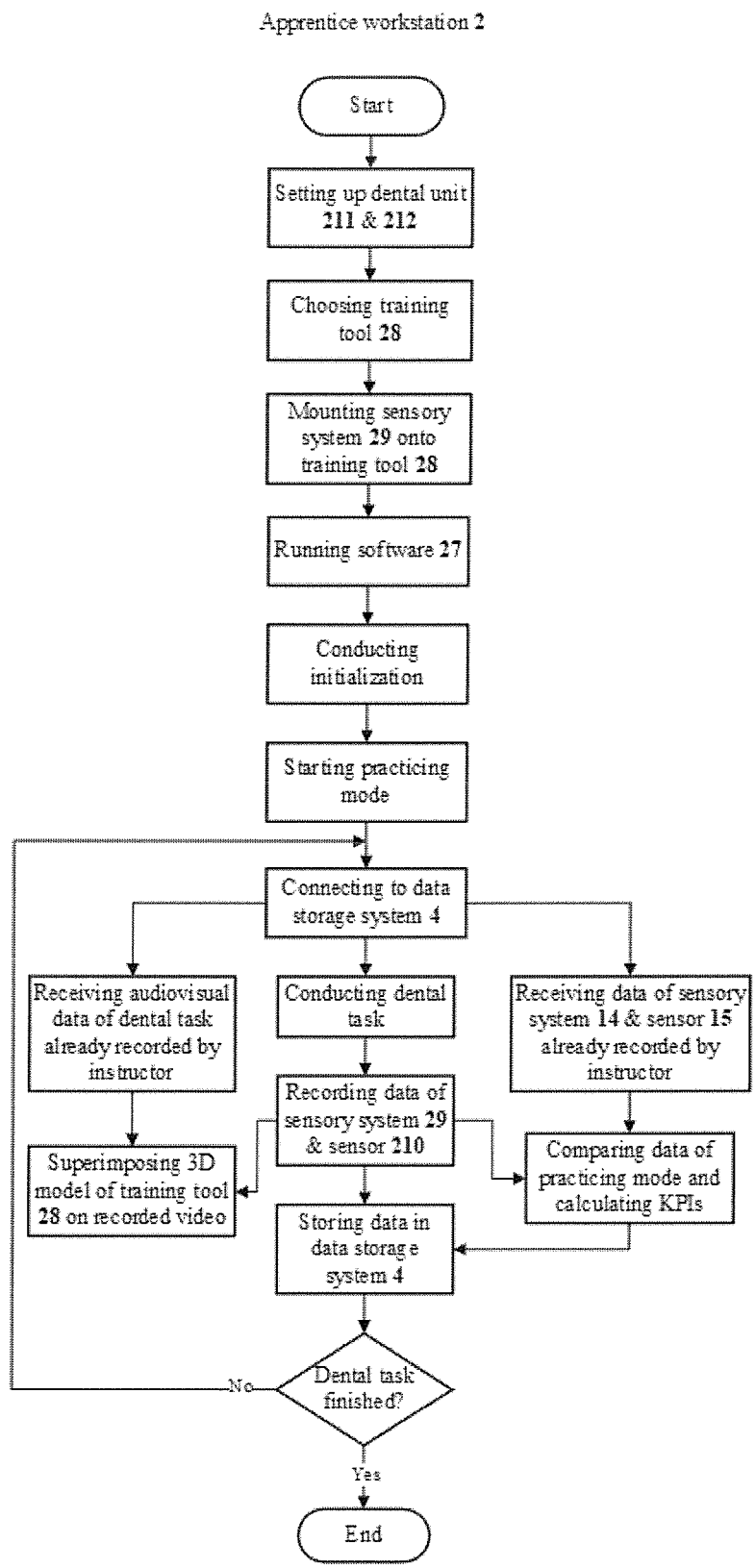
FIG. 7 shows the workflow indicating the steps defined to perform the practicing mode.

FIG. 7 shows steps that each apprentice 21 follows in the practicing mode. First, the dental unit 212 is set up and the training tool 28 appropriate for the dental task is chosen followed by mounting said sensory system 29 onto the training tool 28. Next, the apprentice 21 runs the software and conducts the initialization step according to the instruction manual. Having performed the initialization step, the students start the practicing mode by connecting to the data storage system 4.

Then, three events occur in parallel as follows: (i) Event 1: The apprentice 21 starts the given dental task without the instructor supervision, and data of the sensory system 29 and sensor 210 are measured and analyzed in said software 27; (ii) Event 2: Data of sensory system 14 and sensor 15 which are already recorded by the instructor 11 in the teaching mode for the same dental task, are delivered by the software 27; and (iii) Event 3: The video of the same dental task which is already recorded by the instructor 11 in the teaching mode, is delivered to the software 27.

Having received the video, in Event 3, the 3D model of the training tool 28 is superimposed onto the video, in an augmented reality environment, and is then moved using said data of sensory system 29 analyzed in Event 1. Moreover, the analyzed data of both sensory systems 14,29 and said sensors 15,210 are compared. The KPIs defined for the evaluation of each apprentice's performance in the practicing mode are calculated. All analyzed data and KPIs are stored in the data storage system 4 and a list of graphical and statistical reports are generated for both apprentice 21 and instructor 11 which contain quantitative measures to evaluate apprentice's skills. This procedure is then repeated until the dental task is completed by the apprentice.

Some of the components of the overall dental procedure training system as described above will now be described in further detail.

As shown in FIG. 2, the instructor workstation 1 is intended for use by an instructor 11 which uses a dental tool 12 to perform a dental procedure on an actual tooth or a tooth model 13. The dental tool 12 is modified only to include a sensory system 14 supported in general proximity to a base of the housing of the tool away from a handle grip portion of the tool intended to be gripped in the hand of a user and opposite from the working tip of the tool which engages the tooth model 13. The dental tool 12 is operatively connected to a dental unit 19 in the usual manner to control the operation of the tool using a rheostat 110 as an input. The rheostat 110 of the dental unit comprises a foot pedal or lever that can be displaced through a range of angles or positions to control the speed of operation of the rotating tip of the dental tool. More precisely, the rheostat 110 incorporates an adjustable resistor for adjusting current or varying resistance in an electrical circuit of the dental unit according to the position of the lever. A rheostat sensor 15 is operatively connected to the rheostat 110 to determine the position or degree of engagement or disengagement thereof and communicate the sensed condition back to the processing unit 16 of the instructor workstation.

The processing unit 16 includes a computer processor operatively connected to a memory storing programming instructions in the form of software 17 thereon so as to be arranged to be executed by the processor to perform the various functions of the instructor workstation as described herein.

The instructor workstation further includes a recording system 18 comprising a video camera which captures a sequence of video images of the hand of the instructor 11 grasping the handle grip portion of the dental tool 12 while performing the dental procedure on the tooth model 13. The recording system is operatively connected to the processing unit 16 such that the captured video images are communicated to the processing unit for subsequent communication for storage in the data storage system 4 and/or communication through the data transmission system 3 to the apprentice workstations 2 in real time or at a later time.

The sensory system 14 of the instructor workstation includes a variety of sensors as described herein which track position, orientation, angular velocity, acceleration etc. of the dental tool 12 as a continuous stream of data over the duration of the dental procedure being performed by the instructor using the dental tool 12. All of the data sensed by the sensory system 14 and by the rheostat sensor 15 is also collected by the processing unit 16 together with the video images captured by the recording system 18 for storage together on the data storage system 4 such that the data and video images can be recalled together, in real time or at a later time, over the data transmission system to the apprentice workstations 2.

The instructor workstation also includes a suitable display 111 operatively connected to the instructor processing unit 16 for displaying various data to the instructor. The information displayed to the instructor can include operational characteristics relating to the various apprentice workstations in real time including data from the sensory systems of the apprentices workstations or performance indices calculated by the processing unit of either the apprentice workstation or the instructor workstation. The processing unit 16 of the instructor workstation is also capable of calculating corresponding performance indices in a similar manner to the apprentice workstations so that the performance indices of the instructor can be compared to the performance indices of the apprentices. This comparison can also be graphically represented on the display of the instructor workstation.

Turning now to the apprentice workstation according to the embodiment of FIG. 3, in this instance, the apprentice uses the custom-designed tool 22 as a training tool to be gripped in their respective hand. More particularly, the training tool has a housing which is substantially identical in size and shape to the housing of the dental tool 12 of the instructor with a tip that is not operational but visually representative of the working tip of the dental tool 12. The training tool also includes a handle grip area 225 defining the location along the housing that is gripped within the hand of the apprentice. The handle grip area is a generally cylindrical portion about the exterior of the housing of the tool located at an intermediate length between the base of the tool and the tip which represents the functional working tip of the dental tool 12. The diameter at the handle grip area may be up to 21 mm and may extend a length of approximately 45 mm so as to be identical in size and shape to the handle grip area of the dental tool 12 while also being located at the same distance from the tip of the training tool 22 as the distance of the handle grip area of the dental tool 12 is from the corresponding working tip of the tool.

The vibrotactile actuation system 222 is fully embedded within the interior of the housing of the training tool 22. The vibrotactile actuation system 222 is arranged to generate vibrations which emulate the vibrations produced in the dental tool 12 as a result of the motor that drives rotation of the working tip at speeds from 0 to 400,000 RPM. The vibrotactile actuation system 222 is located fully within the handle grip portion 225 of the training tool 22 to emulate the behaviour of the drive motor of the dental tool 12. To ensure that the vibrotactile actuation system 222 generates a similar vibrotactile feedback to the apprentice as the vibrotactile feedback felt by an instructor using the actual dental tool 12, the sensory system 221 on the apprentice training tool 22 is located at approximately the same location on the housing of the tool as the location of the sensory system 14 located on the dental tool 12. The sensory systems of the instructor dental tool 12 and the apprentice training tool 22 comprise a similar configuration of sensors arranged to record similar accelerations about a similar configuration of multiple axes. In this manner, the processing unit 26 of the apprentice workstation can drive operation of the vibrotactile actuation system 222 such that the vibrotactile feedback sensed by the sensory system 221 is substantially the same or within a threshold range of the vibrotactile feedback sensed by the sensory system 14 of the instructor dental tool 12. The actual vibrational feedback felt by the apprentice 21 through the handle grip area 225 of the training tool should thus be substantially identical to the vibrational feedback felt by the instructor holding the dental tool 12 as felt through the corresponding handle grip area of the dental tool 12.

The vibrator 223 is used independently of the vibrotactile actuation system 222 to generate haptic alerts to the apprentice and is also located fully internally within the housing of the training tool 22 within the handle grip area. In this manner, the general look and feel of the training tool 12 within the hand of the apprentices substantially identical to the look and feel of the dental tool 12 within the hand of the instructor. In this manner, the standard shape of the dental tool has not been altered in creating the training tool 22. The actuation system used for regeneration of the vibration, the sensory system used for the measurement purposes and the vibrator used for alarming the apprentice are all embedded inside the training tool with no extraneous equipment mounted externally of the housing of the tool. The actuation system is located in a place where it applies vibration to the apprentice's fingers holding the training tool. This way the apprentice can feel realistic vibration generated by the instructor's hand pieced through the fingers' sense of touch. In other training tools, the actuation system is mounted outside of the tool and the apprentice has two options to feel the vibration, that is either to touch the actuator itself which causes the apprentice not to hold the tool directly, or to hold the training tool at a point where it should be held in real practice while the actuator is installed in an offset location which does not transfer the expected tactile feeling to the apprentice's hand.

The vibrator 223 is a coin-shaped or square-shaped motor which generates the force along one axis that is perpendicular to the surface of the motor as shown in FIG. 5. It is used to apply the abrupt force only to the tips of the fingers when the apprentice's KPIs (key performance indices) are not in the pre-defined ranges. In other words, the force generated by the vibrator 223 is applied latitudinally with respect to the shape of the custom-designed training tool 22. An example of the vibrator 223 can be the linear resonant actuators which are in the market for generating instant forces only in one direction.

The vibrotactile actuation system 222 is a vibration motor which is used to generate the vibration radially. In order to generate vibrotactile feeling on the apprentice's hand, the actuation system 222 is used which can generate the vibration continuously and transfer the vibrotactile feeling to the surfaces of the fingers involved in holding the custom-designed training tool 22 when the instructor 11 is performing the dental task.

The main difference between the vibrotactile actuation system 222 and the vibrator 223 is in the way they generate the force. The vibrator 223 may not be a good choice for transferring the vibrotactile feelings to the apprentice's hand as it is able to apply the force only in one direction and to certain surfaces of the fingers (fingers tips). However, the vibrotactile actuation system 222 is able to generate the radial force in all radial directions from a longitudinal axis of the tool so as to be applicable to all surfaces of the fingers which are in contact with the custom-designed training tool 22. Therefore, the actuation system 222 can reflect substantially-realistic vibrotactile feedback to the apprentice's hand.

The sensory and actuation systems and existing devices in the market and literature have several limitations impeding their adaptation for a functional handheld dental handpiece with the following main challenges that led to a small actuation system, a vibrator and a sensory system being embedded inside the training tool 22. In prior systems, the standard structure of the tool typically has to be altered to accommodate the sensors and actuators affecting the handling of the instrument by apprentices and thus possibly altering measurements of position orientation and acceleration. Also, space restriction of the dental instrument when modifying a conventional dental tool with sensors limits the use of large-sized sensors and actuators such that they cannot easily be incorporated into the tool. Therefore, previous applications have mounted the actuation system or sensors onto the external surfaces of the dental tool which do not allow for accurate reproduction of vibrotactile feedback. Inappropriate locations of the sensors, actuation system, and vibrator affects the workability of the entire system as this may alter measurements of position orientation and acceleration as opposed to the training tool 22 according to the present invention in which the actuation system and vibrator are located in an area where the apprentice's hand holds the tool at a distance of approximately 45 mm from the tip of the training tool which represents the working tip of the dental tool 12. In this manner, the vibration and tactile feeling generated by the vibrotactile actuation system is similar to the one generated at the instructor's handpiece and is transferred to the apprentice's hand realistically. In other training tools, the apprentice employs a dental tool with an extra actuator mounted onto it which may block the apprentice's view while working on a tooth model. It is also important that the appearance of the dental tool at the apprentice workstation be similar to an actual dental tool as any extra attachment may distract the apprentice from the main intention of the invention which is efficient learning and realistic representation of an actual dental procedure.

Turning now back to the apprentice workstation according to the embodiment of FIG. 3, in this instance a platform 25 act as a base for the workstation which can be placed on a suitable supporting surface such as a table surface and the like. A tool holder 24 is mounted on the platform so that when the training tool 12 is positioned within the tool holder, an initial registration of the starting position and orientation of the training tool can be determined. Once the system is activated, the position and orientation of the training tool 22 are tracked to detect any changes in position and orientation from the initial starting position within the tool holder 24.

The apprentice workstation of FIG. 3 further includes a suitable display 213 also mounted on the platform for displaying various data to the apprentice including sensed operational characteristics of the training tool 22 of the apprentice or of the dental tool 12 of the instructor, calculated performance indices of the training tool 22 of the apprentice or of the dental tool 12 of the instructor, video images captured by the recording system 18 of the instructor workstation and communicated to the apprentice workstation through the data transmission system 3 or from the data storage system 4, graphical representations of the position and orientation of the training tool 22 of the apprentice in real-time for comparison to corresponding position and orientation of the dental tool 12 represented in the video images, and/or any other data which may be relevant to the apprentice. The processing unit 26 of the apprentice workstation also comprises a suitable computer processor in cooperation with a memory storing programming instructions representing the software 27 to be executed by the processing unit to perform the various functions of the apprentice workstation as described herein. The processing unit communicates with the sensory system 221 of the training tool 22 for collecting sensed data, communicates with the display 213 of the apprentice workstation for displaying relevant data, and communicates with the data transmission system 3 for exchange of relevant information with the instructor workstation to perform the various functions of the system as described herein.

As described herein, the training tool 22 of the apprentice workstation thus extends longitudinally between a first end locating the tooltip representative of the working tip at the operating end of the dental tool, and an opposing second end forming the base of the training tool 22. The handle grip area 225 that locates the vibrotactile actuation system and vibrator therein is thus located at an intermediate location in the longitudinal direction which is spaced longitudinally inward from both of the first and second ends of the training tool.

In use, the processing unit of the training tool 22 receives data from the sensory system relating to a plurality of different operating characteristics of the training tool that are sensed by the sensory system. The sensed operating characteristics each corresponds to similar operating characteristics which are sensed by the sensory system of the instructor workstation so that the processing unit of the apprentice workstation can subsequently compare the operating characteristics of the training tool relative to corresponding operating characteristics of the instructor dental tool 12 to generate a quantitative comparison that can be measured and displayed on both the displays of the instructor workstation and the apprentice workstation. The operating characteristics can include performance characteristics determined by movement or position of the training tool under control by the apprentice. The processing unit may be further arranged to generate an alert if the performance characteristics sensed by the sensory system of the training tool deviates from an acceptable range stored on the processing unit. The acceptable range may be defined by a threshold margin relative to corresponding operating characteristics sensed by the sensory system of the dental tool of the instructor. The vibrator 223 supported within the housing of the training tool 22 is arranged to be operated in response to the determination of the processing unit that an alert condition exists in which the monitored performance characteristic has deviated from the acceptable range stored on the processing unit.

Using the relevant sensed data from the training tool 22 and the sensed data from the dental tool 12, the processing unit is arranged to generate a graphical representation illustrating the comparison of the compared operating characteristics. When the graphical representation includes video images representative of a position and orientation of the dental tool, the graphical representation may further include representation of the position and orientation of the training tool 22 superimposed onto the video images captured of the instructor workstation over the duration of the dental procedure. The graphical representations generated by the processing units can be displayed on either the displays of the apprentice workstation or the instructor workstation.

The processing unit of the apprentice workstation is arranged to calculate a plurality of different performance indices in which each index is calculated using one or more sensed operating characteristics sensed by the sensory system of the apprentice workstation. Similar performance characteristics are calculated using the data from the instructor workstation. In one example, a performance index is calculated using operating characteristics including movement characteristics relating to the movement of the training tool as determined by relevant sensors including acceleration along plural different axes and angular velocity about plural different axes. The calculated performance index can also be calculated using operating characteristics including position characteristics relating to the position of the training tool such as the angular orientation or distance of the training tool from the initial registration of the tool holder 24 which effectively defines a training tool locator on the base station which is arranged to register the initial position and orientation of the tool relative to the base station.

When using a video capturing system to capture images of the dental tool performing the dental procedure at the instructor workstation, the apprentice workstation displays the video images on the respective display thereof either in real time or by replaying the stored video images at a later date. In either instance the stored video images can also be displayed along with sensed operating characteristics of the dental tool 12 performing the dental procedure. The processing unit is arranged to compare the sensed operating characteristics of the training tool 12 to the corresponding sensed operating characteristics of the instructor dental tool 12 while displaying the video images in real-time or while replaying the video images at a later time subsequent to the actual dental procedure.

In general, the apprentice workstation and instructor workstation of the training system described herein according to the embodiment of FIG. 3 are generally used to generate vibrotactile feedback using the vibrotactile actuation system 222 of the at least one apprentice workstation while the handle grip is held in the hand of the apprentice such that the apprentice senses the vibrotactile feedback through the handle grip of the training tool of the apprentice workstation in a manner which mimics vibrotactile feedback felt by the instructor using the dental tool 12 to perform the dental procedure.

The apprentice workstation according to the embodiment of FIG. 4 will now be described in further detail. Similarly to the previous embodiment, the apprentice workstation in this instance again comprises a platform 25 defining a base station which supports a tool holder 24 forming an initial tool locator to support a training tool therein, however the training tool in this instance comprises an actual dental tool 28 which is operational to perform the same dental procedure as the dental tool 12 of the instructor workstation. The base station or platform 25 in this instance again supports a display 213 thereon which is operatively connected to the processing unit 26 of the apprentice workstation for displaying captured video images from the recording system of the instructor workstation along with various sensed data somewhat similarly to the previous embodiment.

In the embodiment of FIG. 4, the training tool 28 is an operational dental tool having general dimensions and a working tip configured similarly to the dental tool 12 to perform the same dental procedure. A motor within the training tool 28 drives movement of the tip of the training tool in the same manner as the instructor dental tool 12. The training tool 28 thus also has a handle grip area substantially identical to the handle grip of the dental tool 12 for gripping in a similar manner by the apprentice. In this instance, no vibrotactile actuation system is provided nor is there an indicator vibrator 223 within the tool; however, a sensory system 29 is provided on the housing of the training tool 28 at substantially the identical location as the sensory system 14 on the instructor dental tool 12 which also corresponds approximately to the location of the sensory system 221 on the apprentice training tool 22 of the previous embodiment. The sensory system 29 thus senses vibrations generated by the motor within the training tool 28 similar to the vibrations generated in the instructor dental tool 12 by its respective motor. Also similarly to the previous embodiment, the processing unit 26 of the apprentice workstation comprises a processor and a memory storing programming instructions thereon corresponding to the software 27 arranged to be executed by the processor to perform the various functions of the apprentice workstation that is described herein.

As the training tool, 28 is an operational dental tool, it is operatively connected to a dental unit 212 to control the operation thereof by controlling the drive of the motor internally within the actual tool 28 which drives the rotation of the working component at the tip of the tool. A rheostat 211 is also provided which is substantially identical to the rheostat 110 of the dental tool 12 so that the apprentice can control the operating condition of the training tool 28. A rheostat sensor 210 is operatively connected to the rheostat 211 for measuring the operating condition thereof similarly to the sensor 15 of the instructor workstation. In this instance, the processing unit 26 communicates with the sensor 210 in addition to communicating with the sensory system 29 to collect relevant operating characteristics of the respective components to be recorded by the apprentice processing unit 26 into the data storage system 4 when communicated over the data transmission system 3. The processing unit 26 of the apprentice workstation can also retrieve all of the corresponding sensed data from the instructor workstation for comparing the sensed operating characteristics and as well for calculating respective performance indices of each of the instructor workstation and the apprentice workstation using one or more of the sensed operating characteristics to calculate each performance index so that the performance indices can also be compared. All of the compared data can be displayed on the display 213 of the apprentice workstation and/or on the display 111 of the instructor workstation.

In use, the instructor initially performs a dental procedure using the dental tool while the recording system and the sensors of the instructor workstation record a sequence of video images of the operator's hand grasping the dental tool 12 throughout the procedure on the tooth model 13 together with recording of all sensed data and performance indices which are calculated in real time. All of the collected data can be communicated in real time to an apprentice performing the same procedure on the apprentice workstation according to FIG. 4 or can be stored on the data storage system 4 to be recalled and replayed at a later date when an apprentice subsequently desires using the apprentice workstation to perform the dental procedure on the respective tooth model 23 of the apprentice workstation. In each instance, video images of the instructor performing the dental procedure on the instructor workstation along with the corresponding sensed data are replayed on the display of the apprentice workstation while the apprentice performs the same procedure.

As the sensory systems of all tools are substantially identical, the configuration of the sensors within the sensory systems 29, 221, and 14 are substantially identical for recording similar operating characteristics of the respective tools with which they are associated and so as to allow similar performance indices to be calculated for each of the different tools for comparison to one another. As in previous embodiments, the position and orientation of the training tool 28 held by the apprentice can be compared to the corresponding position and orientation of the dental tool held by the instructor such that the data can be compared to one another, for example by generating a graphical representation of the apprentice training tool 28 overlaid onto the video images of the actual position and orientation of the dental tool for display on the corresponding display of the apprentice workstation.

Since various modifications can be made in this invention as herein above described, and many apparently widely different embodiments of same made, it is intended that all matter contained in the accompanying specification shall be interpreted as illustrative only and not in a limiting sense.

The invention claimed is:

1. A dental procedure training system for use with an instructor workstation comprising a dental tool having a handle grip arranged to be gripped in a hand of an instructor and a sensory system arranged to sense at least one operating characteristic of the dental tool while the dental tool performs a dental procedure, the training system comprising:
   at least one apprentice workstation for use by an apprentice, the at least one apprentice workstation comprising:
   a training tool having a handle grip representative of the handle grip of the dental tool so as to be arranged to be gripped in a hand of the apprentice;
   a vibrotactile actuation system embedded in the training tool so as to generate vibrotactile feedback to the apprentice through the handle grip of the training tool;
   a processing unit arranged to operate the vibrotactile actuation system of the training tool according to said at least one operating characteristic sensed by the sensory system of the instructor workstation;
   wherein the vibrotactile actuation system is supported internally within the handle grip of the training tool.

2. The training system according to claim 1 wherein the handle grip of the training tool of said at least one apprentice workstation has a shape and a size corresponding to a shape and a size the handle grip of the dental tool.

3. The training system according to claim 1 wherein said at least one apprentice workstation further comprises a sensory system arranged to sense at least one operating characteristic of the training tool, and wherein the processing unit is arranged to compare said at least one operating characteristic of the training tool to said at least one operating characteristic of the dental tool.

4. The training system according to claim 3 wherein the sensory system of the training tool of said at least one apprentice workstation is supported on to the training tool at a respective location which corresponds to a location of the sensory system on the dental tool.

5. The training system according to claim 3 wherein the at least one operating characteristic sensed by the sensory system of the training tool of said at least one apprentice workstation includes vibrotactile characteristics generated by the actuation system.

6. The training system according to claim 5 wherein the processing unit of said at least one apprentice workstation is arranged to operate the actuation system by comparing vibrotactile characteristics sensed by the sensory system of the training tool to vibrotactile characteristics sensed by the sensory system of the dental tool.

7. The training system according to claim 3 wherein the at least one operating characteristic sensed by the sensory system of said at least one apprentice workstation includes performance characteristics determined by movement or position of the training tool under control by the apprentice.

8. The training system according to claim 7 wherein the processing unit of said at least one apprentice workstation is arranged to generate an alert if the performance characteristics sensed by the sensory system of the training tool deviate from a pre-defined acceptable range of performance characteristics stored on the processing unit.

9. The training system according to claim 3 wherein the processing unit of said at least one apprentice workstation is arranged to generate a graphical representation illustrating the comparison of said at least one operating characteristic of the training tool to said at least one operating characteristic of the dental tool.

10. The training system according to claim 9 wherein the graphical representation comprises video images representative of a position and an orientation of the training tool superimposed onto respective video images representative of a position and an orientation of the dental tool over a duration of the dental procedure.

11. The training system according to claim 3 wherein the at least one operating characteristic sensed by the sensory system of said at least one apprentice workstation include position, orientation, velocities, accelerations, and jerk components of the training tool along one, two, or three axes.

12. The training system according to claim 3 wherein said at least one apprentice workstation includes a base station having a training tool locator arranged to register an initial position and orientation of the training tool relative to the base station.

13. The training system according to claim 1 in combination with the instructor workstation and a data transmission system in communication between the instructor workstation and said at least one apprentice workstation so as to be arranged to communicate the sensed at least one operating characteristic of the dental tool with the processing unit of said at least one apprentice workstation.

14. The training system according to claim 13 wherein said at least one apprentice workstation further comprises a sensory system arranged to sense at least one operating characteristic of the training tool, and wherein the processing unit is arranged to compare said at least one operating characteristic of the training tool to said at least one operating characteristic of the dental tool in real time during the dental procedure performed by the dental tool.

15. The training system according to claim 13 wherein the instructor workstation further comprises a video capturing system arranged to capture video images of the dental tool performing said dental procedure and said at least one apprentice workstation comprises a display arranged to display the video images of the dental tool performing the dental procedure.

16. The training system according to claim 15 further comprising a recording system arranged to store the video images captured by the video capturing system along with the sensed at least one operating characteristic of the dental tool performing the dental procedure and replay the stored video images along with the sensed at least one operating characteristic subsequent to the dental procedure, wherein said at least one apprentice workstation further comprises a sensory system arranged to sense at least one operating characteristic of the training tool, and wherein the processing unit is arranged to compare said at least one operating characteristic sensed by the sensory system of the training tool to said at least one operating characteristic of the dental tool while replaying the stored video images.

17. The training system according to claim 13 wherein said at least one apprentice workstation further comprises a sensory system arranged to sense at least one operating characteristic of the training tool, and wherein the instructor workstation includes a rheostat arranged to control operation of the dental tool and wherein the sensory system of the instructor workstation is arranged to measure an engagement level or a disengagement level of the rheostat and wherein the processing unit of said at least one apprentice workstation is arranged to calculate at least one performance index using the at least one operating characteristic sensed by the sensory system of the at least one apprentice workstation and wherein the instructor workstation further comprises:

a video capturing system arranged to capture video images of the dental tool performing said dental procedure; and a recording system arranged to store in a data storage system: (i) the video images captured by the video capturing system, (ii) the sensed at least one operating characteristic of the dental tool performing the dental procedure, (iii) said at least one performance index calculated by the processing unit of said at least one apprentice workstation, and (iv) an operational status of the rheostat.

18. A method of use of the training system according to claim 1, the method comprising using the vibrotactile actuation system of said at least one apprentice workstation to generate vibrotactile feedback while the handle grip is held in the hand of the apprentice such that the apprentice senses the vibrotactile feedback through the handle grip of the training tool of the at least one apprentice workstation which mimics vibrotactile feedback felt by the instructor using the dental tool to perform the dental procedure.

* * * * *